United States Patent [19]
Chigira

[11] Patent Number: 5,237,910
[45] Date of Patent: Aug. 24, 1993

[54] AUTOMATIC VENDING MACHINE
[75] Inventor: Noboru Chigira, Saitama, Japan
[73] Assignee: Sanyo Electric Co., Ltd., Osaka, Japan
[21] Appl. No.: 890,504
[22] Filed: May 28, 1992
[30] Foreign Application Priority Data May 31, 1991 [JP] Japan .................................. 3-129969

[51] Int. Cl.⁵ .................... A47J 27/00; A47J 31/00; A47J 37/00; G07F 11/00
[52] U.S. Cl. ................................... 99/282; 99/280; 99/286; 99/287; 99/289 R; 99/357; 99/484; 222/82; 222/238; 414/412; 366/295
[58] Field of Search ............... 99/325, 326, 334, 335, 99/357, 342, 443 R, 443 C, 484, 280–282, 286, 287, 289 R, 290; 221/150 HC, 150 R, 150 A; 364/478, 479; 222/80–82, 238; 414/412, 326; 366/297–301, 154–158, 603

[56] References Cited
U.S. PATENT DOCUMENTS

| | | | |
|---|---|---|---|
| 2,576,492 | 11/1951 | Vogel | 414/412 |
| 2,831,591 | 4/1958 | Morton | 414/412 |
| 3,482,718 | 12/1969 | Moriarty | 414/412 |
| 4,696,615 | 9/1987 | Ettischer et al. | 414/412 |
| 4,936,515 | 6/1990 | Poag et al. | 99/286 X |
| 4,993,315 | 2/1991 | Huber et al. | 99/289 R |
| 5,083,502 | 1/1992 | Enomoto | 99/287 X |
| 5,103,716 | 4/1992 | Mikkelsen | 99/289 R |
| 5,104,002 | 4/1992 | Cahlander et al. | 222/83 |

FOREIGN PATENT DOCUMENTS 1359015 3/1964 France .................................. 99/357

Primary Examiner—Timothy F. Simone
Attorney, Agent, or Firm—Darby & Darby

[57] ABSTRACT

The material pack opening apparatus of the invention comprises: a pair of substantially parallel, spaced apart teeth shaped sting edges arranged in an front-to-end (longitudinal) direction; a transverse sting edges arranged perpendicular to, and at substantially intermediate position of, said paired sting edges; and a platform for holding thereon said sting edges, said apparatus enabling a material pack at the bottom of multiple packs each containing powder material and stacked on an article stock rack, to be cut open the bottom of the lowest material pack widely along two cut lines by pressing from above said packs, and, by vibrating said platform, enabling the bottom pack unpacked, freeing the powder material almost completely into a material accommodation unit in a short time.

7 Claims, 29 Drawing Sheets

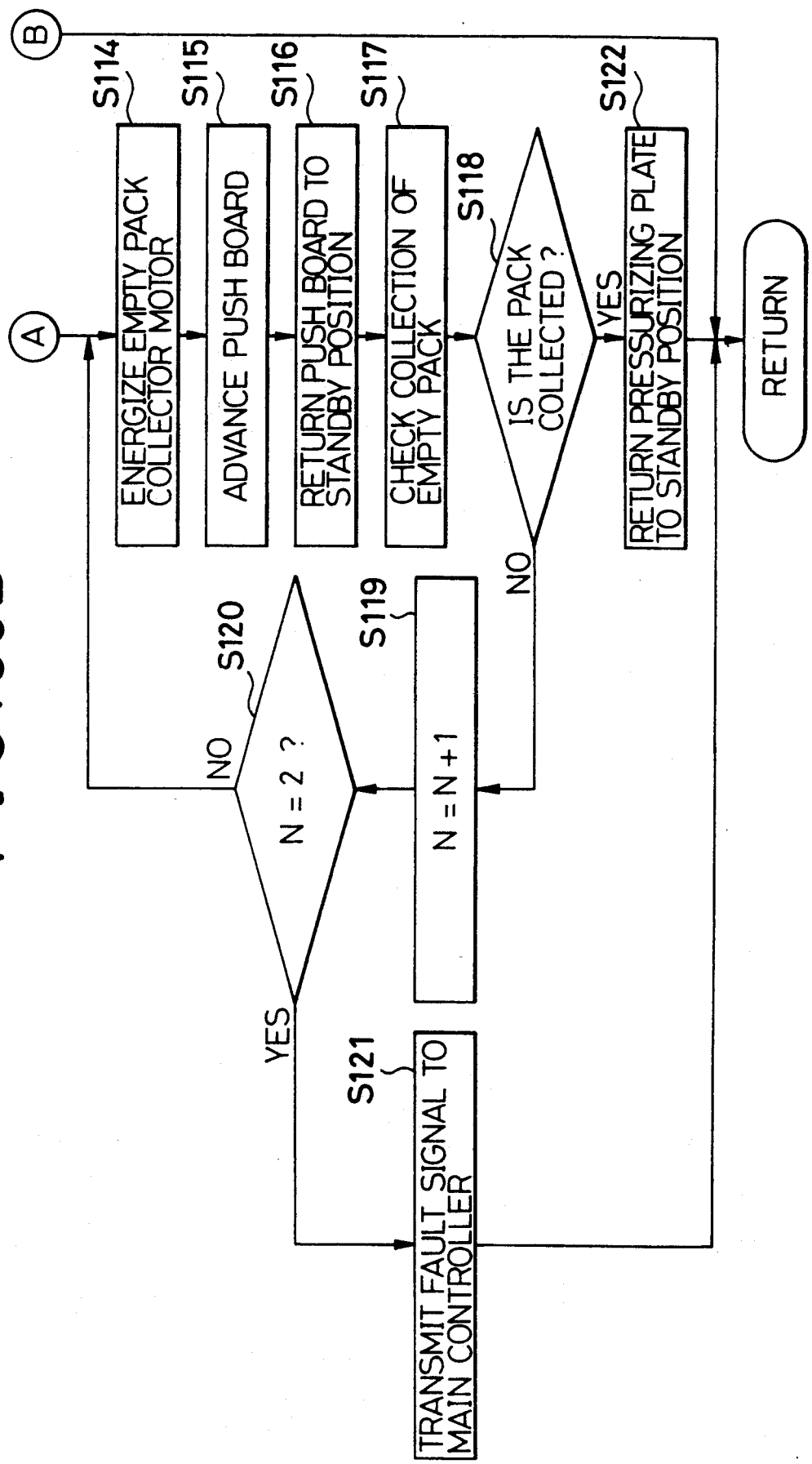

AUTOMATIC VENDING MACHINE

FIELD OF THE INVENTION

The invention relates to an automatic vending machine. More particularly it relates to an automatic vending machine for automatically furnishing beverage such as coffee and cocoa prepared from a powder drink material supplied from a material supply apparatus installed in the automatic vending machine.

BACKGROUND OF THE INVENTION

In an automatic vending machine for vending coffee, for example, by percolating coffee from powdered coffee beans, the powdered coffee material would be deteriorated if it is exposed to the atmosphere for a prolonged period of time because of oxidation of the material by oxygen and moisture in the atmosphere, resulting in very poor coffee if prepared.

The inventor of this application disclosed in U.S. patent application Ser. No. 692,151 now U.S. Pat. No. 5,163,356 an apparatus for storing a powder material in a hopper, which hopper is in turn supplied with the powder material when the material becomes scarce in the hopper containing the material by opening a pack. The pack is supplied from a pack storage section of the machine.

With the apparatus mentioned above, powder material preserved in the pack may be kept fresh since it is not exposed to atmosphere, thereby maintaining good quality of the material. However, the apparatus used for opening the pack often leaves part of the material in the pack when the pack is opened. Furthermore, it takes time to unpack the material in the pack, since the apparatus has only a pair of parallel, linear arrays of cutters having regularly spaced-apart edges which may cut the pack only along two parallel lines at the bottom of the pack.

SUMMARY OF THE INVENTION

The invention is directed to overcome such disadvantages as mentioned above. An object of the invention is, therefore, to provide means for supplying powder material (hereinafter referred to as material supply units) for use with an automatic vending machine in such a way that the apparatus is capable of unpacking the powder material quickly and completely, leaving little material in the pack.

An automatic vending machine of the invention comprises:

article storage racks for storing stacked packs containing the powder material;

pressuring means for providing from above downward pressure to said stacked packs;

pack opening means for opening the lowest one of the stacked packs pressed by pressuring means, said pack opening means including a pair of substantially parallel cutters each having teeth shaped edges which are spaced apart along the length of the cutter, and including a transverse cutter which are arranged perpendicular to, and connected with, and between substantially central portions of, said paired longitudinal cutters; and further including a platform for holding thereon said cutters;

a vibrator unit for vibrating said platform to thereby facilitate unpacking of the material in the pack;

material storage units for receiving said material released therein and supplying drink preparation unit with a proper amount of powder material in response to a vending instruction;

push means for pushing the empty pack after the removal of the powder material; and empty pack collector units for collecting empty packs pushed by said push means.

With this apparatus a material pack may be opened widely in its lower surface and is vibrated with the vibrator unit so that substantially no powder remains in the pack.

In this case the transverse cutter is preferably formed with teeth shape edges that heap up toward the center of the cutter to form a generally mountain-like shape, and the cutter is preferably located between the near peak positions of said longitudinal cutter.

With this arrangement, in opening the pack under the pressure by the pressurizing unit, the longitudinal cutter first cuts the lower surface of the pack. The transverse cutter then pushes the lower surface of the pack with its heaping edges to cut the pack. In this manner the portion of the pack cut by the longitudinal cutter is further cut wider by the transverse cutter, since the latter cutter cuts into the cut portion. As a result, a transverse cut line intersects longitudinal cut lines even if there is some gaps between the two cutters, thereby securely cutting the lower surface of the material pack.

The material storage unit preferably has a wide upper opening for easily receiving the powder material freed from the pack. The material storage unit is preferably provided therein with an auger mounted at a lower level for allowing a fixed amount of powder material to be delivered at a time, and an agitator having fins thereon, said agitator being mounted above the auger for transporting the powder material in the direction opposite to the direction of delivery by the auger.

This auger makes it possible to prevent uneven distribution of the powder material within the material storage unit after delivery of a portion of the material by the auger.

The pressurizing unit is preferably equipped with: a casing installed vertically along the article storage rack; a drive pulley pivotally supported on a horizontal shaft at the top portion of the casing; a drive belt entrained on the drive pulley and a driven pulley; a pressurizing board secured on the drive belt for pressuring the packs; motor support means rotatably mounted on a horizontal shaft above the casing, for supporting a motor; a motor fixedly supported by the motor support means, with its drive shaft connected with the drive pulley via a gear; a spring having one end thereof connected with the motor support means and another end connected with the casing so that the spring may provide a force of preset strength for pulling the motor support means downward; and a sensor for sensing the rotation of the motor support means when the support means is rotated by a driving force in excess of the preset spring force, said driving force supplied from the output shaft of the motor via the drive pulley.

With this sensor, it is possible to positively detect the abutment of the cutters on the lower surface of a pack even if packs are different in thickness.

It is preferable to provide the material pack opening apparatus with an encoder for measuring the amount of rotation of the drive pulley subsequent to the abutment of the cutter on the pack, so that the depths of the cutters in the pack may be monitored when the cutters are further forced into the material pack in association with the rotation of the motor.

With this encoder, the pressurizing board may be lowered by a predetermined distance based on the measurement of the rotation of the drive pulley after the abutment of the cutter on the pack, so that the cutters always cut in the pack to given depths.

The automatic vending machine of this invention may comprise an array of article storage racks each having pack opener units, vibrator units, material storage units, push means, and empty pack collector units. However, a single common pressurizing unit may be used for the array of the racks.

In this case each of the empty pack collector units is preferably provided with: a motor shaft which is common to other article storage racks;

a drive pulley mounted on the common shaft, in association with the corresponding article storage rack;

a roller mounted below the drive pulley;

a housing having one side thereof rotatably supported by the motor shaft and the other side having a driven pulley;

an empty pack collector belt entrained on the drive pulley and the driven pulley; and a spring for biassing the housing so as to push the collector belt against the roller.

In this arrangement, although the roller receives little driving force from the drive pulley via the pack collector belt during collecting a pack, the roller receives sufficient driving power from other rollers associated with other belts, so that an empty pack may be always collected securely.

BRIEF DESCRIPTION OF THE DRAWINGS

The drawings illustrate major portions of a material supply apparatus for use in an automatic drink vending machine.

FIG. 12 showing a further condition where the packs are further pressed by the pressurizing unit and the lowest pack is cut by the cutter edges; and FIG. 13 showing the push plate pushing the empty pack so that the empty pack is removed and collected in the collector unit.

FIG. 24 showing a state in which the powder material has decreased in the material storage unit FIG. 25 showing a structure thereof; FIG. 26 is a side view of the collector of FIG. 25; and FIG. 27 showing another structure of the collector unit.

FIGS. 30A and 30B are flow charts of a sub-routine, for replenishment of material into the material storage unit B of the material supply apparatus.

DETAILED DESCRIPTION OF THE PREFERRED EMBODIMENT

The invention is now described by way of example with reference to the accompanying drawings.

This automatic vending machine is designed to furnish coffee in a disposable cup by percolating ground coffee beans (powdered coffee). The powdered coffee is preserved in a vacuumized pack (material pack) and is supplied for percolation as needed.

Figure 1:
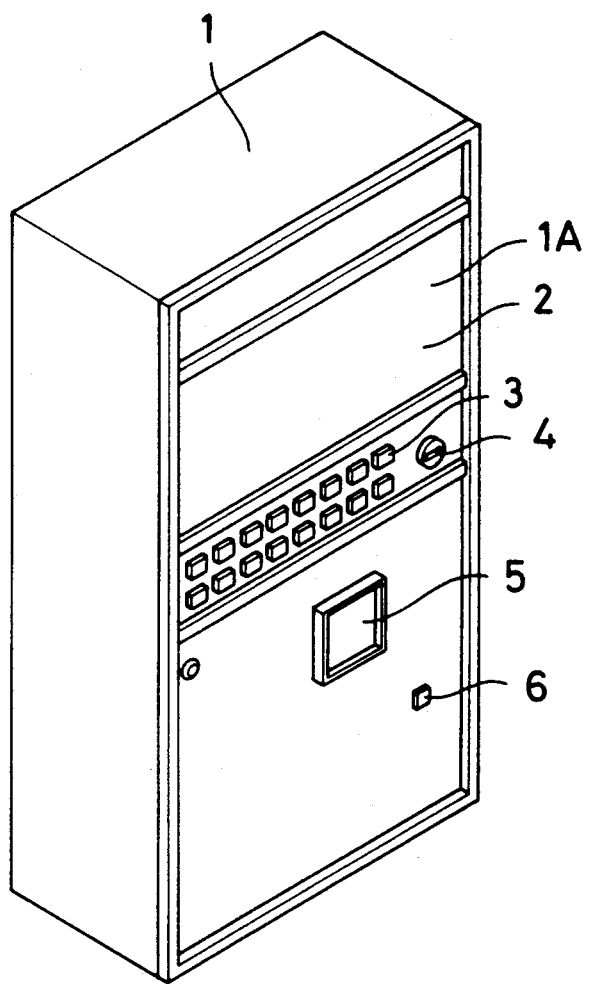
FIG. 1 is a general perspective view of an automatic vending machine equipped with a material supply apparatus embodying the invention.

FIG. 1 illustrates an external view of an automatic drink vending machine of the invention, comprising article display section 2 at the top of a front panel 1, article selection buttons 3 for selecting a type of article or coffee and a coin slot 4 at the middle of the panel, and article outlet 5, a change outlet, and a front door 1A at the bottom of the panel.

Figure 2:
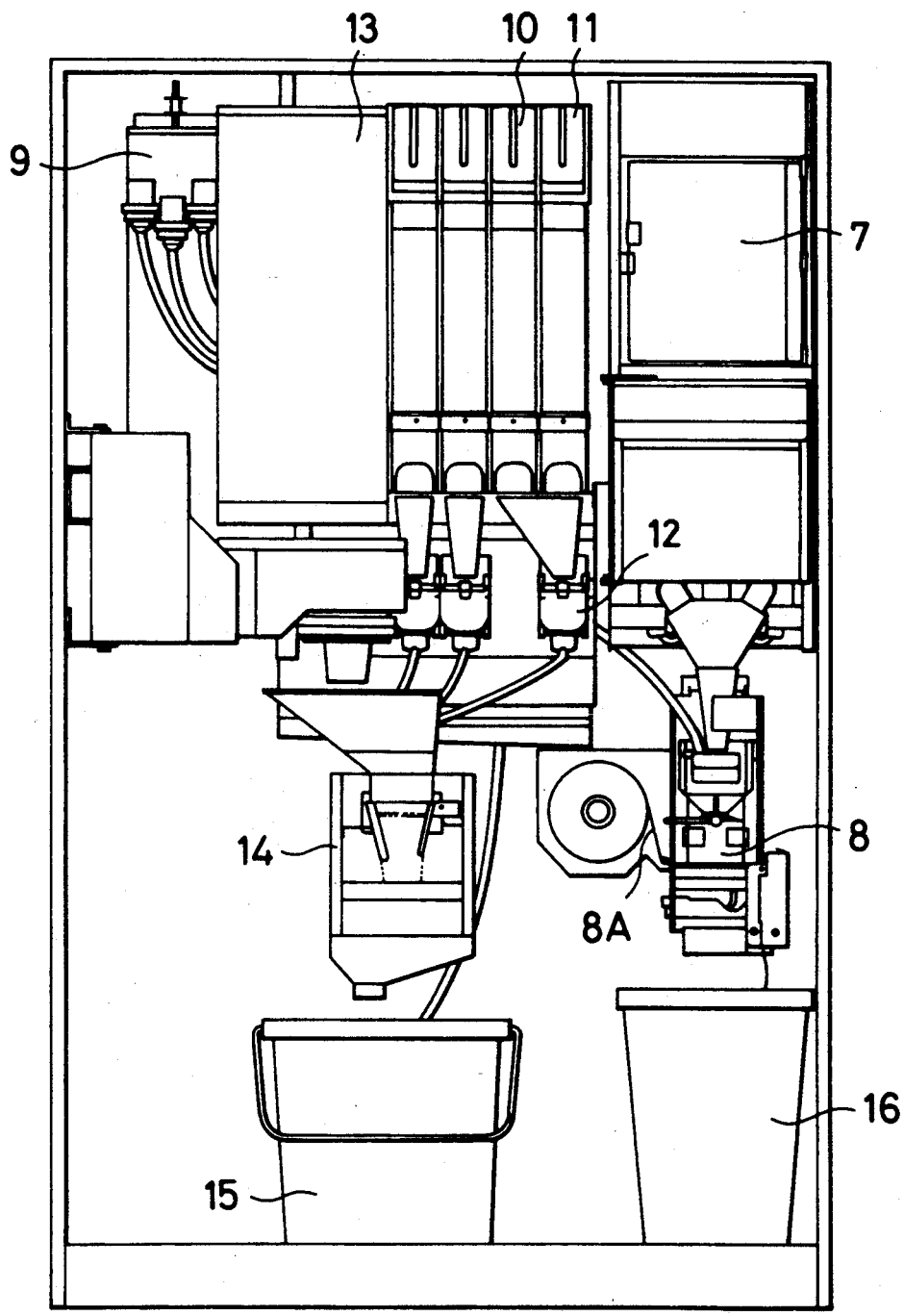
FIG. 2 is a front view of the automatic vending machine of FIG. 1 with its front door removed for illustration of the internal arrangement.

FIG. 2 shows the internal structure of the automatic vending machine as viewed when opening the front door 1A is opened. As shown in the figure, there is provided at an upper corner of the machine a material supply apparatus 7 for storing and supplying coffee material. Below the material supply apparatus 7 is a coffee percolation means 8 for percolating coffee by pouring hot water supplied from a hot water tank 9 to the coffee material supplied from the material supply apparatus 7 into a paper filter 8A. At an upper middle portion of the vending machine are cream material supply means 10 and sugar supply means 11 for supplying cream and sugar, respectively. At relatively low middle portion of the machine is a mixer 12 for mixing or blending coffee percolated from the coffee percolation means 8 with cream and sugar supplied from the cream and sugar supply means 10 and 11, respectively. There are also provided a cup supply means 13 for storing cups and supplying a cup therefrom upon receipt of a vending signal to, a cup receiver 14 below the mixer 12. A waste container 15 further below the cup receiver 14 receives therein coffee which is spilt when the blended coffee is poured into the cup. Above the coffee percolation means 8 is another waste container 16 for receiving the disposable filter 8A used in percolating coffee. The automatic vending machine may also include other structures for other options such as juices and sodas, which are, however, not relevant to the present invention and thus not discussed here.

The automatic vending machine operates as follows. Following the deposition of coins in the coin slot 4 in the front door 1A by a customer, a vending operation is initiated by the operation of an article selection button 3 to choose a desired taste of coffee, i.e., concentration, and amounts of cream and sugar for his taste. Then the cup supply means 13 supplies a cup onto the cup receiver 14. At the same time the coffee percolation means 8 is supplied with a paper filter 8A, ground coffee and hot water, thereby percolating coffee. The percolated coffee is supplied to the mixer 12 along with certain amounts of cream and sugar supplied from the cream material supply means 10 and the sugar supply means 11, respectively, as specified by the article selection button 3. They are then mixed in the mixer 12. The coffee prepared and mixed in this manner is poured into the cup on the cup receiver 14 for the customer.

Figure 3:
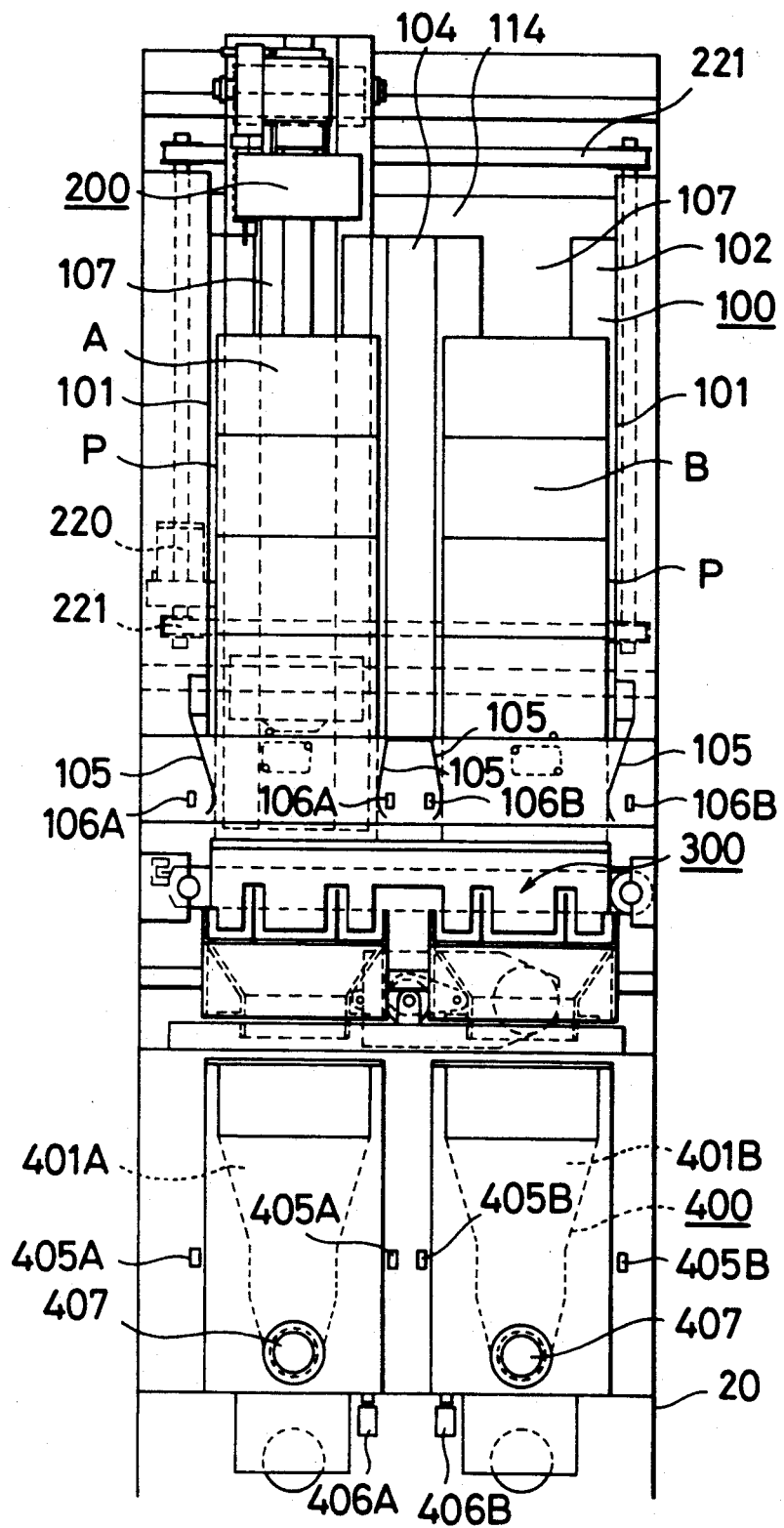
FIG. 3 is a front view of the material supply apparatus to be installed in the automatic vending machine.
Figure 4:
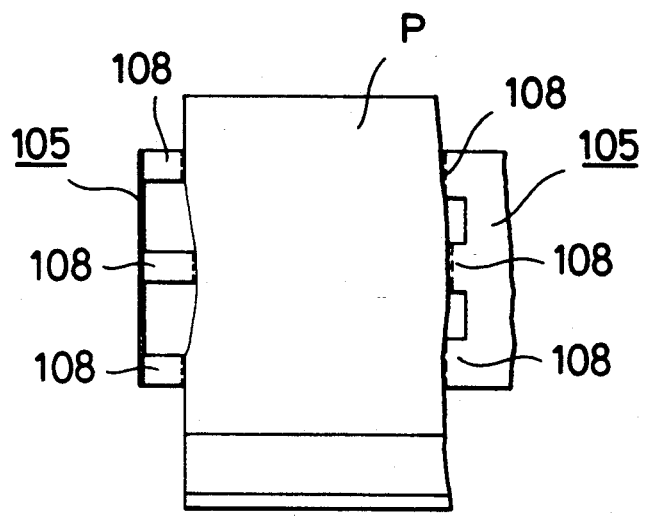
FIG. 4 is a top plan view of a platform of the material supply apparatus, for holding thereon a material pack.
Figure 5:
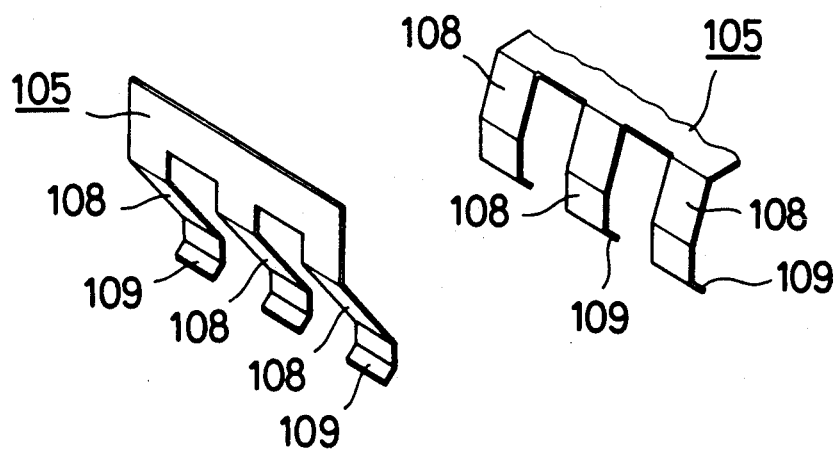
FIG. 5 is a perspective view of the platform.

As shown in FIG. 3 the material supply apparatus 7 comprises: article storage racks 100 for storing vertically stacked packs P containing the powder materials or ground coffees; pressuring means 200 for pressurizing from above the stacked packs in the racks 100; pack opening means cut-and-push sections 300 for opening the lowest ones of the stacked packs to unpack the material and for push the pack emptied; material storage units 400 for receiving therein the material from the cut-and-push sections 300 and for supplying the percolator with a proper amount of material in response to a vending instruction; and empty pack collector units 500 for collecting empty packs pushed by the cut-and-push section 300.

Each article storage rack 100 includes a back panel 102, a front door 103 (see also FIG. 10) which is hinged at its right edge as viewed from the front of the body 1, an intermediate wall 104, forming partitioned storage sections A and B.

Figure 9:
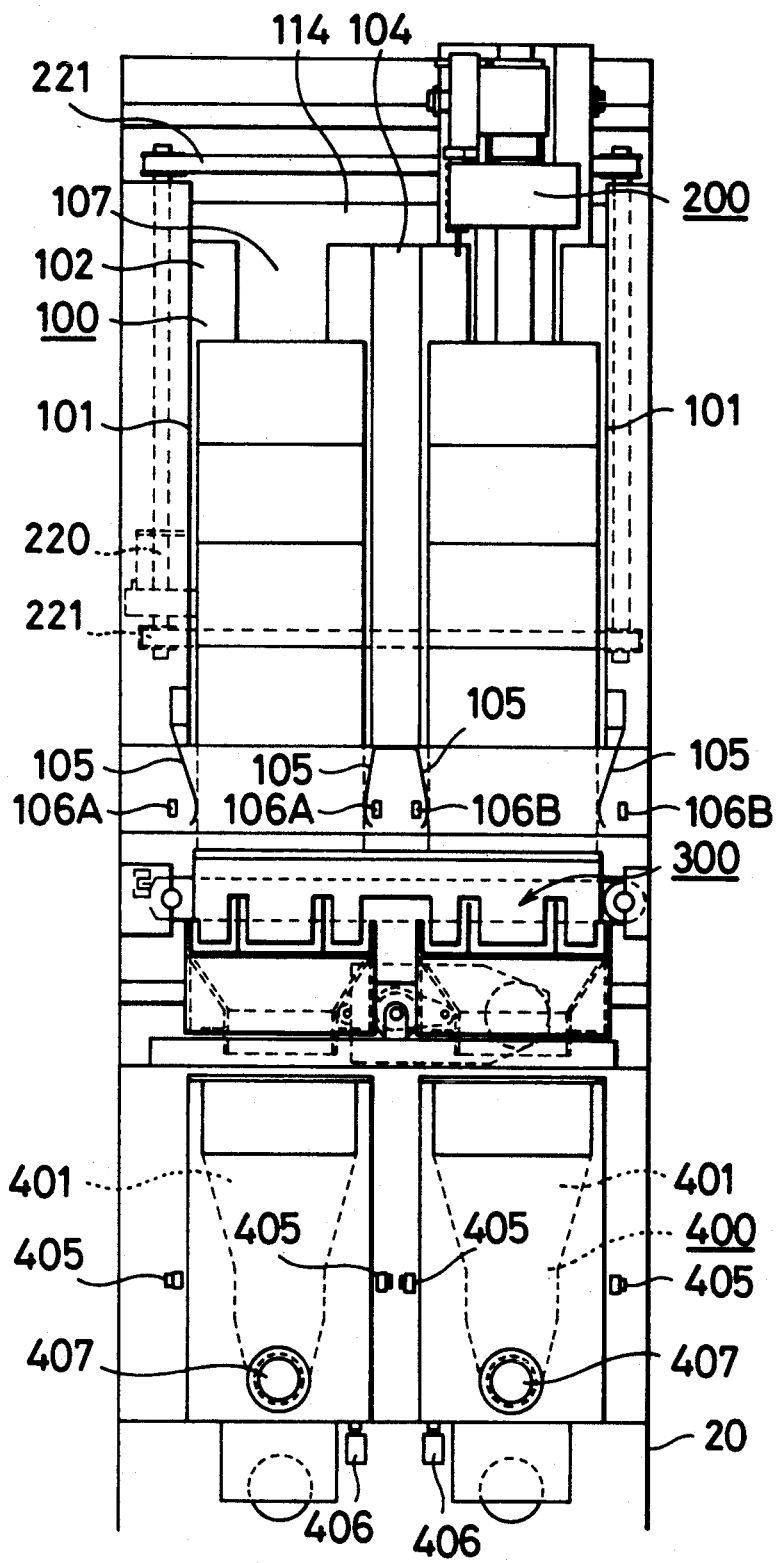
FIG. 9 illustrates a motion of the pressurizing unit away from the position of a storage section A to a storage section B in the material supply apparatus.

As shown in FIG. 9, mounted below the article storage sections A and B is a pair of resilient holder panels 105 projecting to support the lower sides of a material pack P placed therebetween. Mounted at nearly the same level as the holder panels 105 are material pack sensors 106A and 106B for sensing the bottom of a material pack P. Formed in an intermediate portion of each back panel 102 of the article storage sections A and B is a vertically movable slit 107 for allowing the pressurizing unit 200 to move up and down, and at the upper portion of article storage sections A and B there is a space 114 to allow the pressurizing unit 200 for sideward movement.

Each holder panel 105 consists of resilient plates projecting at an angle into the article storage sections A and B as shown in the FIGS. 3–6. Each piece has holder fingers 108 comprising three-bent portions and guide portions 109 extending from, and integral with, the respective fingers 108 and bent outwardly. The upper portion of one panel 105 is fixedly secured to a side wall 101 and the other piece to intermediate wall 104. The holder panels 105 for the article storage section A and B secured to the intermediate wall 104 have upper portions which are integral with each other. The resiliency of the paired holder fingers 108 enables the lowest pack P to be hold in place.

Material packs P are stacked vertically in each of the article storage sections A and B through the front door 103 opened. The lowest pack of the stack abuts against the holder fingers 108 to deform them and is held between them by the frictional forces that arise between the fingers and the pack. Since the holder panels 105 has a plurality of holder fingers 108, any material pack may be securely held by the holder panels 105 if the pack is deformed.

Figure 6:
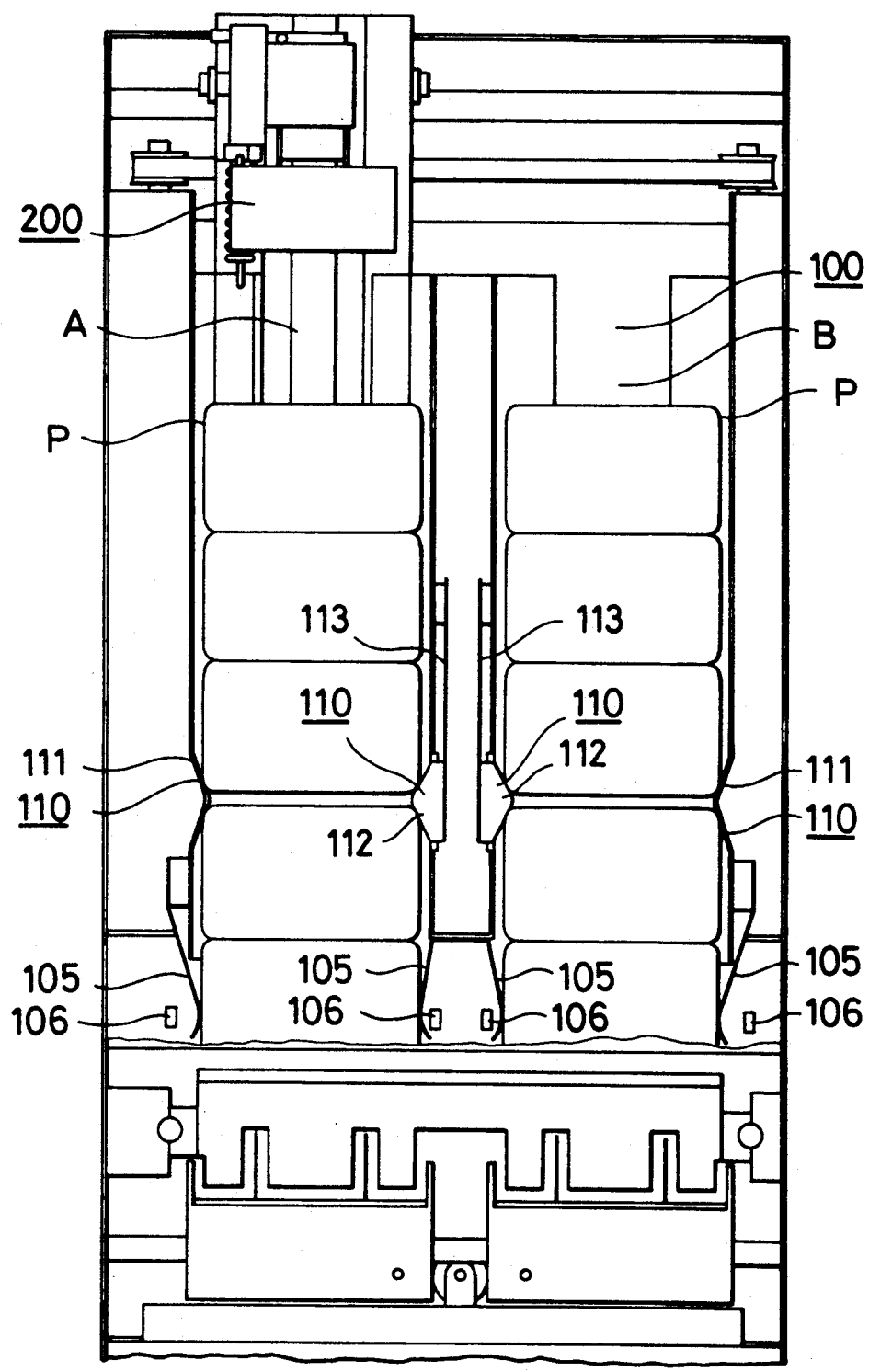
FIG. 6 is a schematic front view of an article storage rack having an auxiliary holder, for use with the material supply apparatus.

An auxiliary holder 110 may be provided, as shown in FIG. 6, above the holder panels 105 for diverting the weight of the packs P that would otherwise be applied to the lowest pack, so that the lowest pack may be securely held by the holder panels 105. The auxiliary holder 110 comprises a projection 111 provided above the holder panels 105 and on the side wall 101 and another movable projection 112 facing the projection 111 and provided on the intermediate wall 104. The movable projection 112 is biased by a spring 113 towards the inside of the article storage sections A or B.

Figure 7:
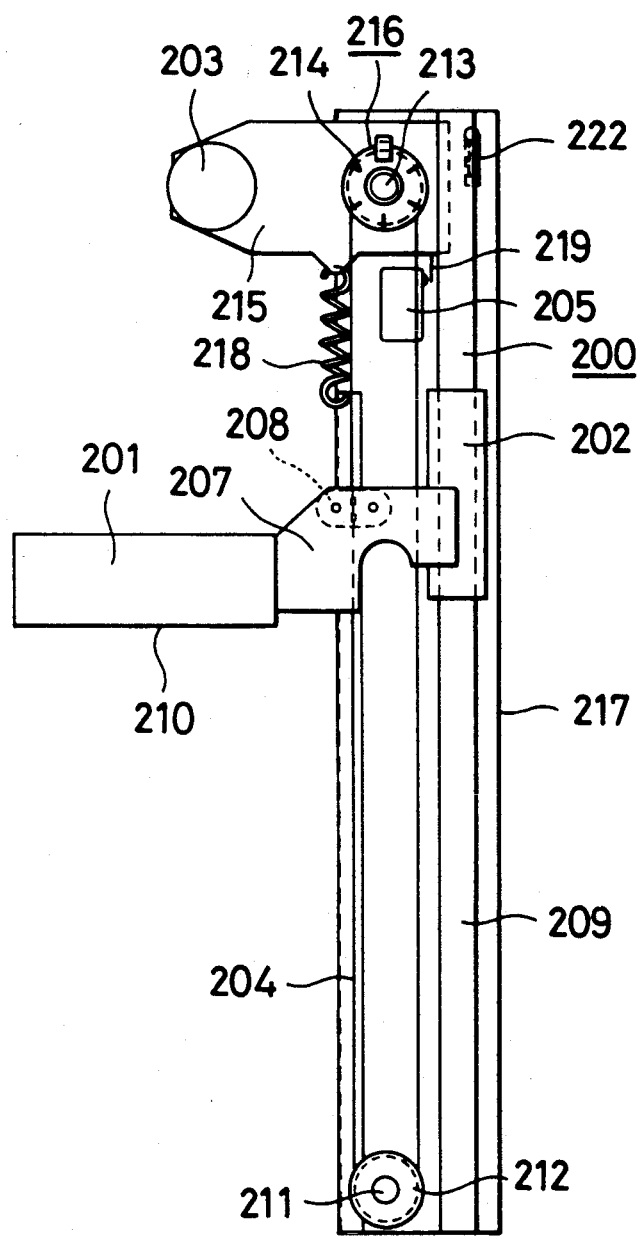
FIG. 7 is a schematic side view of a pressurizing unit to be installed in the article storage rack.
Figure 8:
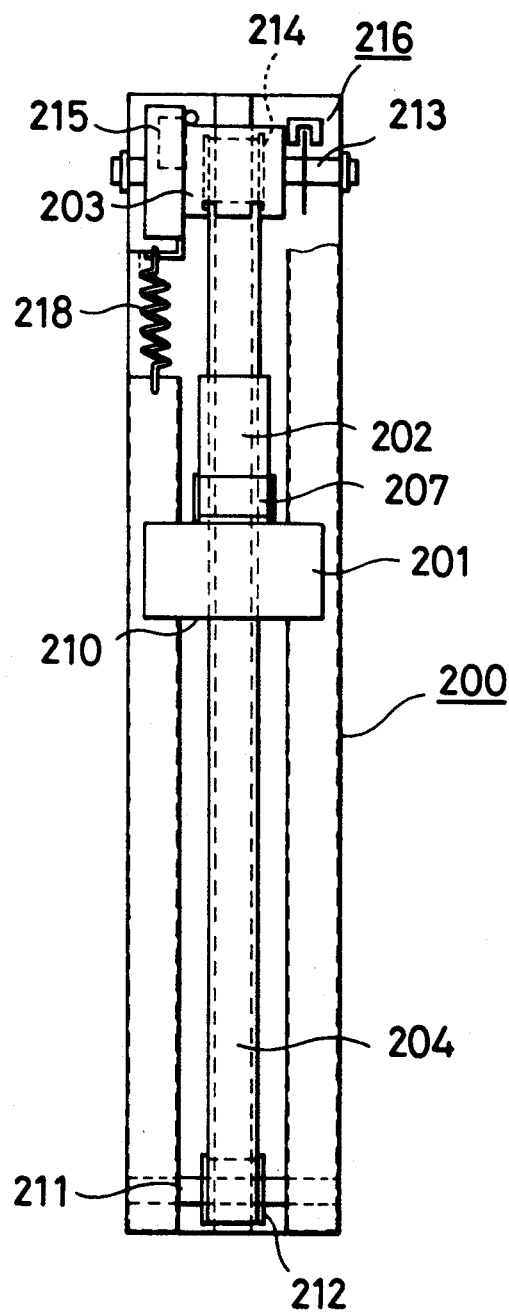
FIG. 8 is a schematic front view of the pressurizing unit.
Figure 10:
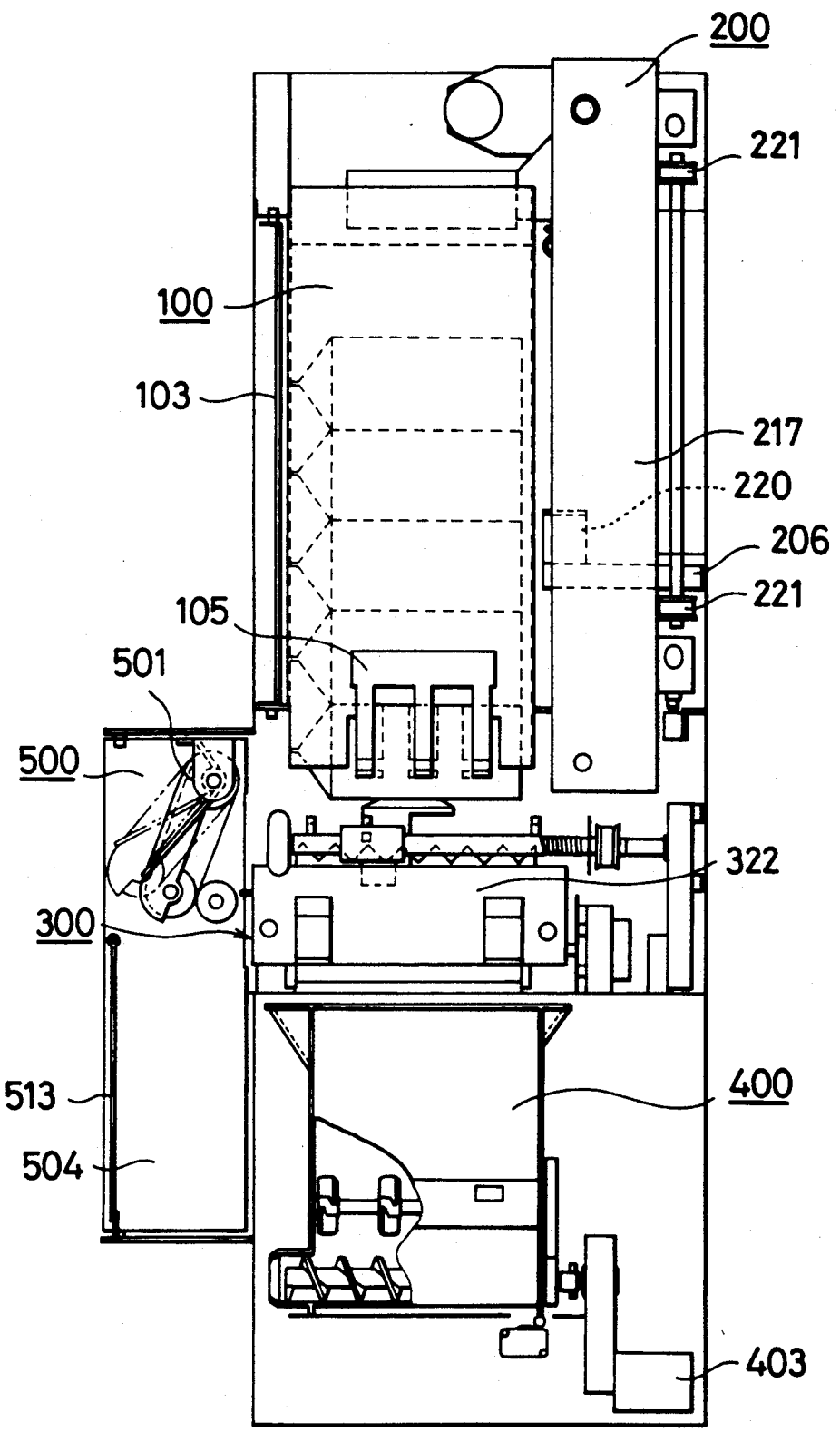
FIGS. 10 through 13 are schematic side views of the material supply apparatus, showing its process to supply powder material from a pack: with FIG. 11 showing a condition where the cutter edges abut on the lowest one of the packs under pressure by the pressurizing unit.

Referring to FIGS. 7 and 10, the pressurizing unit 200 is shown to include a pressurizing board 201 for applying pressure to the material packs P from above, a guide section 202 for guiding the pressurizing board 201, a pressurizing motor 203 for moving the pressurizing board 201, a drive belt 204 for transmitting driving power from the pressurizing motor 203 to the pressurizing board 201, a pressure sensor 205 operable in response to an increase in pressure exerted by the pressurizing board 201 to the material packs P placed on the cut-and-push section 300, and a transport means 206 for transporting the pressurizing board 201 to the article storage sections A and B.

The pressurizing board 201 is connected with the guide section 202 and a pressurizing arm member 207. The bottom of the pressurizing board 201, i.e. pressurizing surface 210, is driven by the belt 204 via the coupling member 208 and an arm member 207. Mounted beneath the guide shaft 209 is a pressurizing board detection sensor 222 operated by the guide section 202 for detection of the pressurizing board 201 in standby position.

The drive belt 204 is entrained vertically in parallel with the guide shaft 209, on a pulley 212 and a drive pulley 214 mounted on a shaft 213 of the pressurizing motor 203. The pulley 212 is mounted on a shaft 211, and the pulley 214 on a shaft 213, both shaft extending horizontally from left to the right as seen in the front view. The drive belt 204 is driven by the drive pulley 214. The pressurizing motor 203 is fixedly mounted on a rotatable support member 215 for supporting the motor 203. The support member 215 is also mounted on the shaft 213. The power of the motor is transmitted to the shaft 213 via a gear mechanism. Mounted on the shaft 213 is an encoder 216 for measuring the angular position of the drive pulley 214. The support member 215 is biased downward by a pressure level spring 218 which is fixed at one end to a casing 217 to set a predetermined biasing pressure level for the support member. Thus, the rotation of the pressurizing motor 203 sets the drive pulley 214 and the drive belt 204 in motion and lowers the pressurizing board 201, thereby eventually bringing the lowest material pack P in abutting contact with the cutter 304. Further rotation of the pressurizing motor 203 will add further downward force acting on the pressurizing board 201. As the downward force increases in magnitude to a certain point at which the force of the spring 218 is surpassed by the pressure of the board 201, the reaction force of the belt is transmitted to the support member 215 to thereby causing a rotation of the support member 215, which in turn causes a projection 219 formed behind the support member 215 to rotate in the clockwise direction and actuates the pressure sensor 205. In this manner a condition of the cutter 304 in abutting contact with the lower surface of the material pack P may be detected if the material packs P vary in thickness. From the measurement of the subsequent rotation of the drive pulley 214 by the encoder 216 the pressurizing board 201 will be accurately lowered so that the cutter 304 may cut open the pack P to a predetermined depth.

As shown in FIGS. 9 and 10, the transport means 206 is provided behind the casing 217, for moving the pressurizing unit 200 in the transverse direction from left to right and vise versa (right/left direction). The pressurizing unit 200 may be moved by actuating a transport motor 220 which in turn drives a transport belt 221 connected with the pressurizing unit 200 running in the right/left direction.

The cut-and-push section 300 comprises a push board 301, a push motor 302 for pushing the push board 301, a push mechanism 303 for transmitting the power of the push motor 302, a cutter 304 for cutting a material pack P, a vibration motor 305 for vibrating the cutter 304, and a vibration mechanism 306 for transmitting the power of the vibration motor 305 to the cutter 304.

The push board 301 has inclined surfaces 307, one inclined towards the front and another toward the rear of the cutting apparatus, and a front face 328 provided for pushing a material pack P. In the lower surface of the push board 301 are cut portions 308 into which edges of the cutter 304 may recede. The right and left ends of the cut portions 308 are connected with the push mechanism 303.

The push mechanism 303 comprises a pair of connection portions 309 at the opposite ends of the push board 301 and connected with the respective ends of the push board 301, a pair of screws 310 engaging with threaded bores of the 309, a push board detector 311A for sensing the push board 301 brought to its foremost position, a push board detector 311 C for sensing the push board 301 brought to its rearmost position, and a push board detector 311B for sensing an intermediate position of the push board 301, an shield 312 for being detected by the sensors 311A–C when the push board 301 reaches the sensors, and a belt entrained on the paired screws 310 to rotate them simultaneously.

The push motor 302 rotates a shaft 314 which drives a belt 313 which in turn drives the screws 310 via a push belt 313.

Each cutter 304, provided for each of the article storage sections A and B, has a pair of parallel cutters 315 each having an array of upward teeth shaped edges spaced apart along the length of the cutter extending in the front-to-rear (F/R) direction as shown in FIGS. 15–18 (the cutters being referred to as longitudinal cutters); a transverse cutter 316 having an array of edges generally forming a mountain-like contour having a peak at its center; and a platform 322 for holding thereon the longitudinal and transverse cutters 315 and 316. The transverse cutter 316 is disposed between the paired longitudinal cutters 315 in such a manner that when looked from above they are H-shaped. That is, the transverse cutter 316 is located between the centers or the peaks of the longitudinal cutters 315. As the lowest pack P is pressed down by the pressurizing board 201, it is first cut in the lower surface by the tips of the longitudinal cutters 315 of the cutter 304 since the edges of the cutters 315 are pushed in the pack to tear it. Thereafter, the cut surface is further cut by the tips of the transverse cutter 316 over a wider region. The opposite end portions of the transverse cutter 316 will further cut in the pack P. It will be understood that in this manner the longitudinal cutters 315 and the transverse cutter 316 may cross-cut widely a material pack P, without being affected by a gap G between the longitudinal cutters 315 and the transverse cutter 316. The cut lines formed by the edges connect with one another.

The transverse cutter 316 is mounted at the lower end thereof on a shaft 317, and is provided at the opposite longitudinal ends with respective stoppers or protrusions 318. The stoppers 318 are formed so that they can move within the windows 319 provided in the longitudinal cutters 315. The transverse cutter 316 are biased backwardly by a spring 320, and are normally held at an upright position where the stoppers 318 abut against frame portions of the windows 319.

The platform 322 for holding the cutter 304 has an opening in its bottom face to allow the content of the material pack P dropped therefrom passes through into a material storage section 400 disposed below it. The platform 322 is connected, with a connection pin 323, to the vibration mechanism 306 which may set in vibrational motion by the vibration motor 305. The platform 322 is slidably supported on a pair of front and rear platform guide rails 324.

The vibration mechanism 306 comprises a vibration shaft 325 vibrated by the vibration motor 305, a circular crank 326 having its axis offset to the vibration shaft 325, and a linking arm 327 for transmitting the vibrational motion generated by the circular crank 326 to the connection pin 323.

Figure 19:
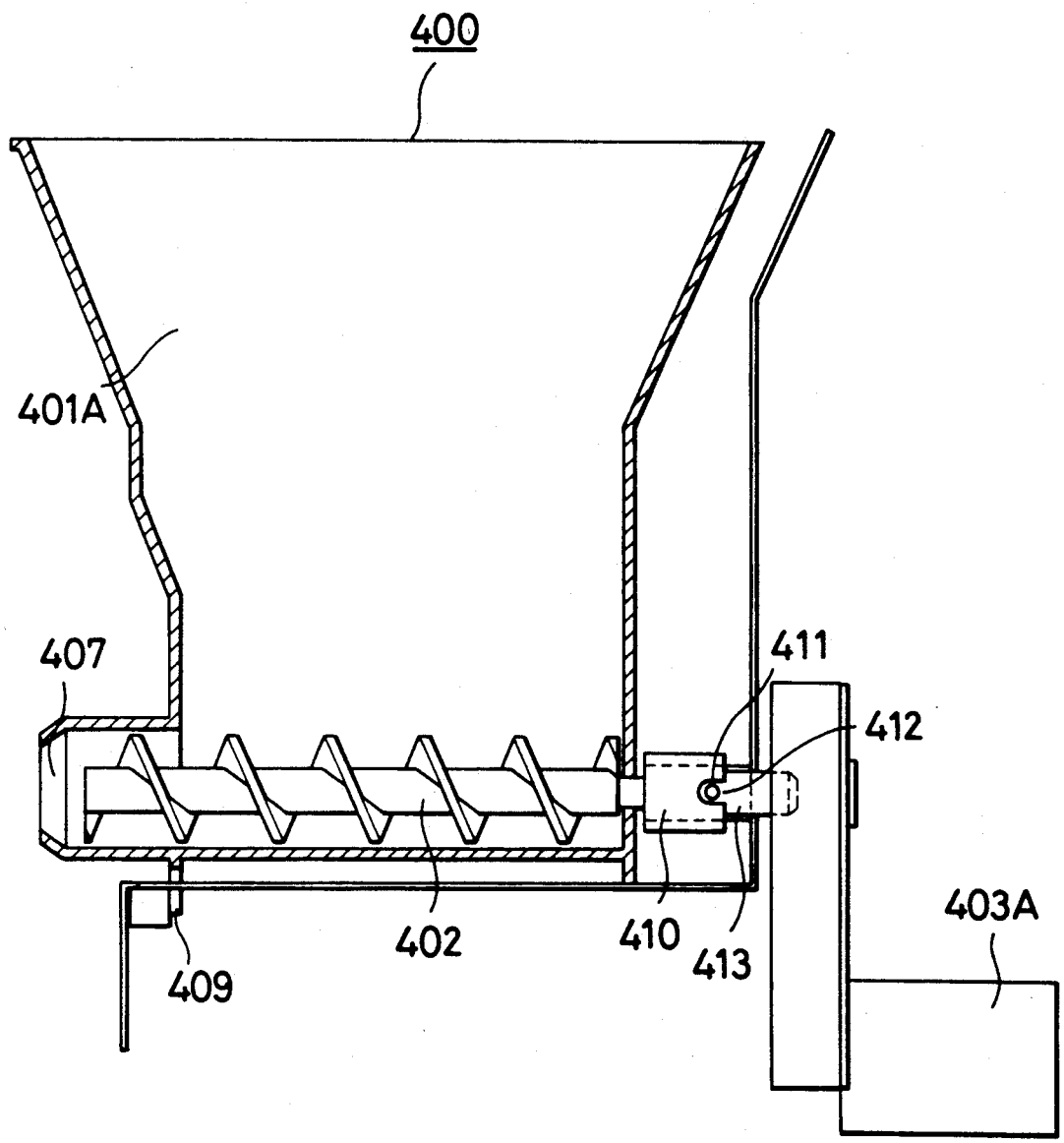
FIG. 19 is a side view of the material storage unit for storing powder material supplied form a material pack.
Figure 20:
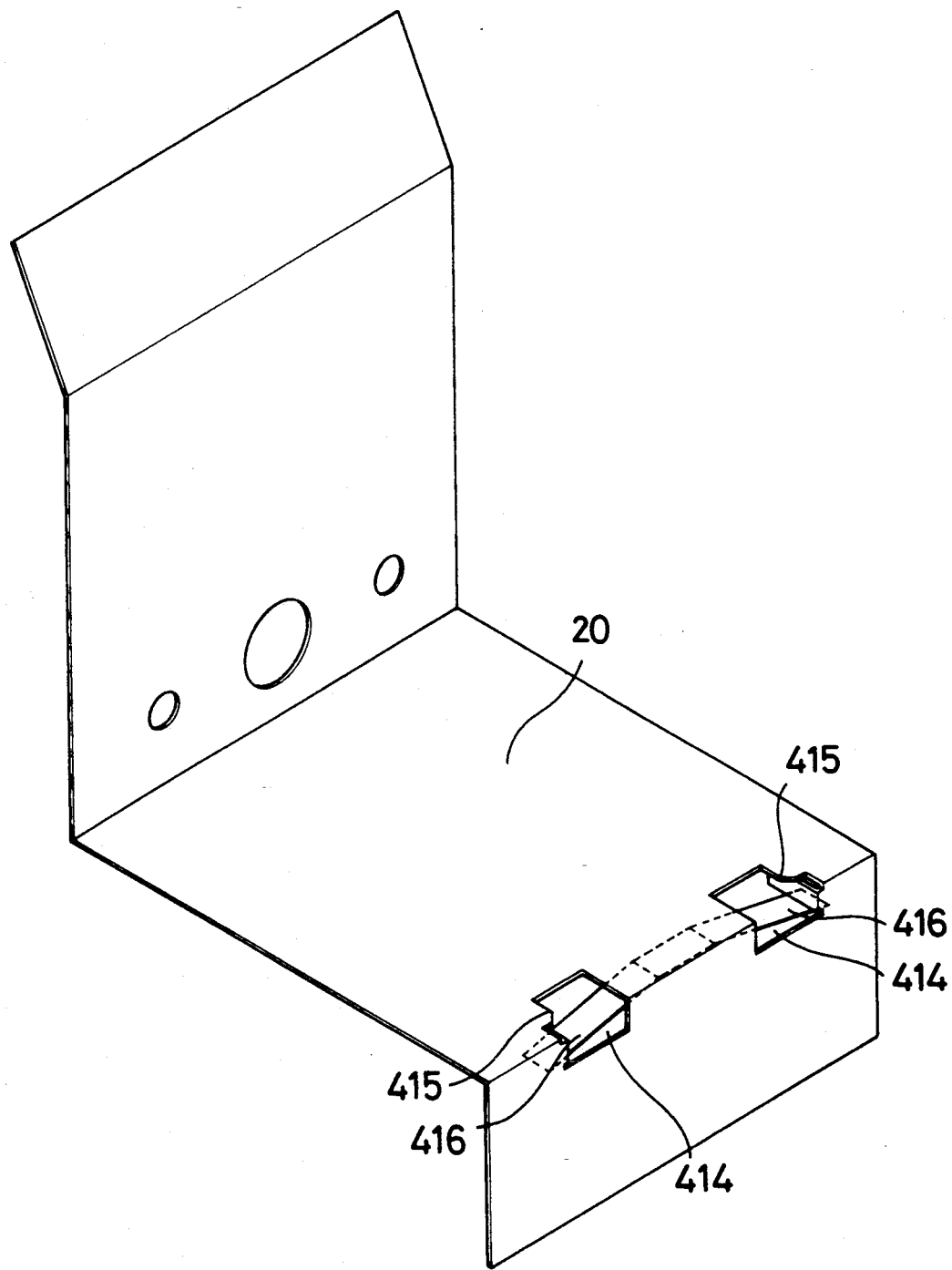
FIG. 20 is a perspective view of a casing for holding the material storage unit.
Figure 21:
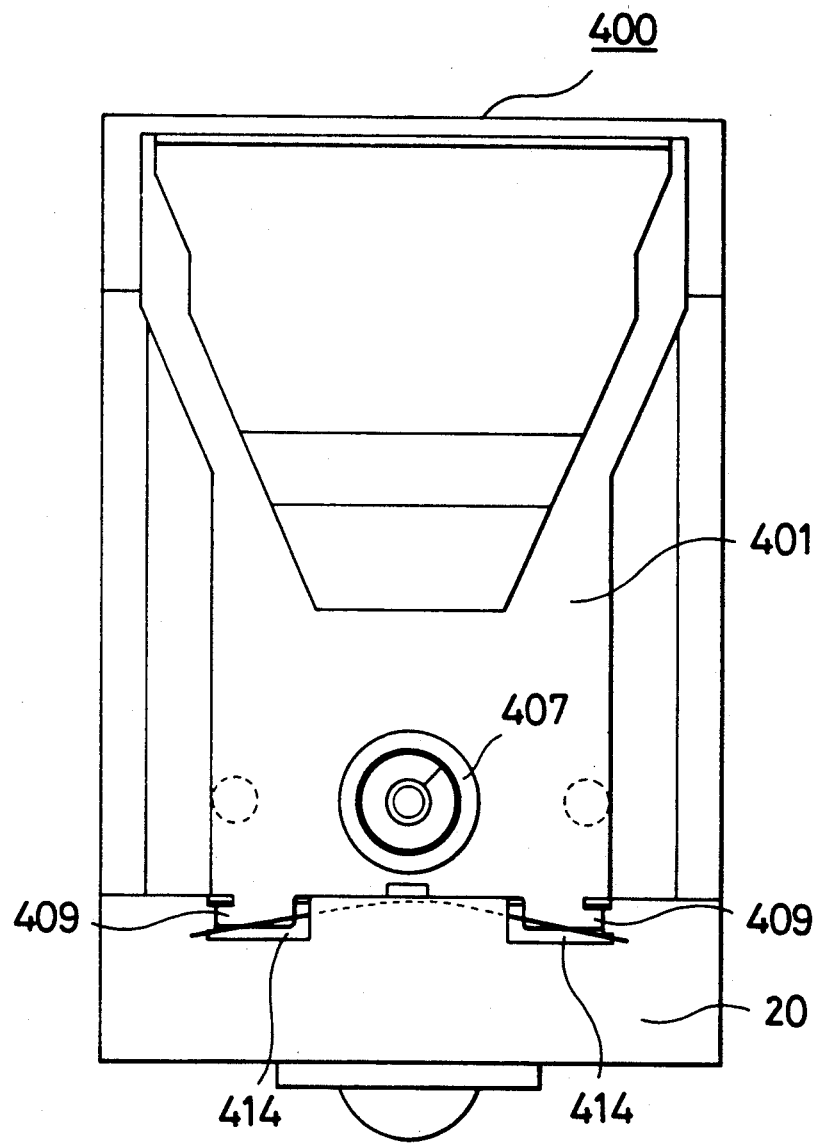
FIG. 21 is a front view of the material storage unit and the casing.
Figure 22:
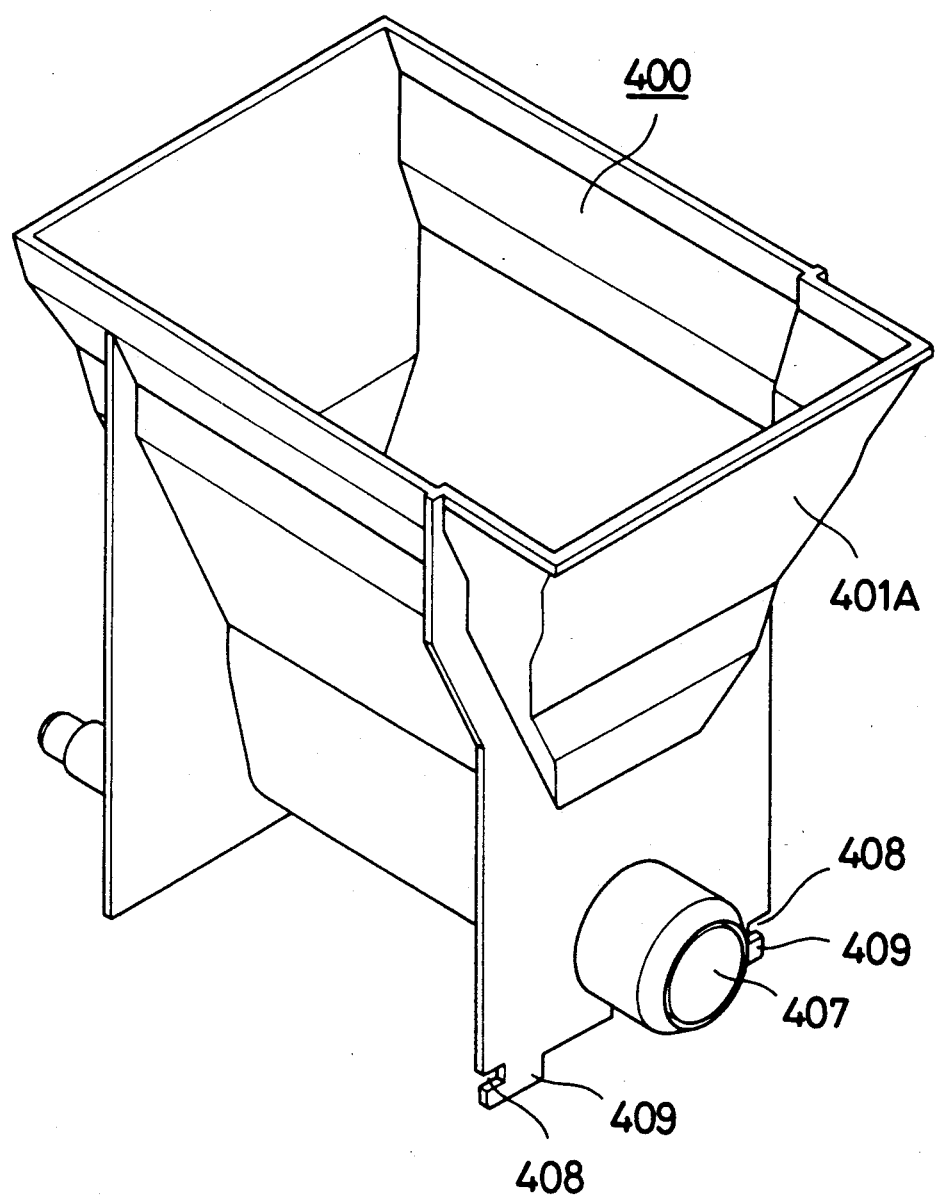
FIG. 22 is a perspective view of the material storage unit.

As shown in FIG. 19, the material storage section 400 includes two hoppers or material storage units 401A and 401B removably mounted on a casing 20 of the material supply apparatus 7, which are associated, respectively, with the article storage sections A and B and comprise augers 402 for delivering the material from the hoppers 401A and 401B, an auger motors 403A and 403B, residual-amount sensors 405A and 405B for sensing the amounts of the material remaining in the hoppers 401A and 401B, respectively, and hopper sensor switches 406A and 406B which are provided on the casing 20 and, when in contact with the bottoms of the hoppers 401A and 401B, detect the respective hoppers 401A and 401B in place.

As shown in FIG. 19 through 22, each of the hoppers 401A and 401B has a large opening and a lower outlet 407. The hopper also has a pair of engagement pieces 409 each having a cut 408.

Formed at the rear end of the auger 402 is a coupler 410 having a engaging section 411 for receiving the driving power from an auger motor 403. The hopper sensor switches 406A and 401B will detect the presence of the hopper 401A and 401B as mentioned above. The driving force of the auger motor 403 is transmitted to the coupler 410 via a drive shaft 413 having an engagement pins 412. The casing 20 is formed with cut portions 414 in correspondence with the pair of the engagement pieces 409. Mounted in the cut portions 414 are projections 415 which engage with the engagement pieces 409, and stoppers 416. The stoppers 416 are made of a resilient material, and may be depressed downward when mounting the hopper 401A and 401B, after which the stoppers 416 recover their original normal positions in front of the engagement pieces 409, and engage with the hoppers 401A and 401B.

In removing the hopper 401A and 401B, the stoppers 416 are pushed down to disengaged from the engagement pieces 409. This allows the hoppers 401A and 401B to be pulled out.

Figure 23:
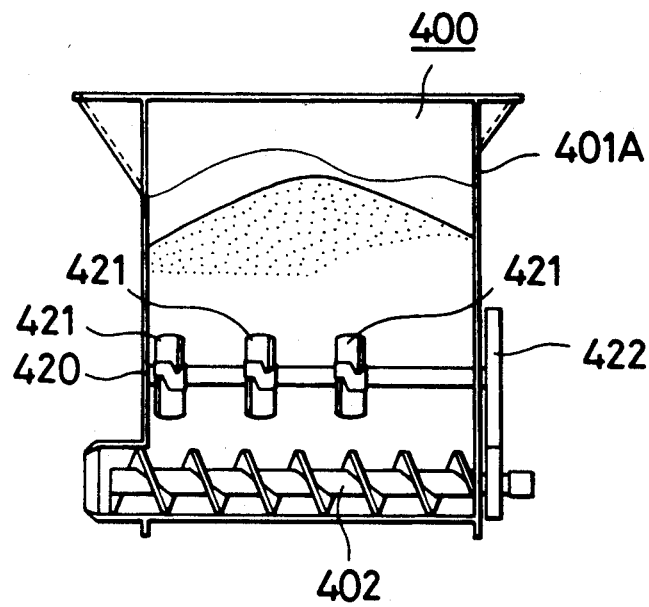
FIGS. 23 and 24 show a condition of a powder material contained in the material storage unit having an agitator in accordance with the invention: with FIG. 23 showing a state immediately after the powder material is supplied from a material pack.
Figure 24:
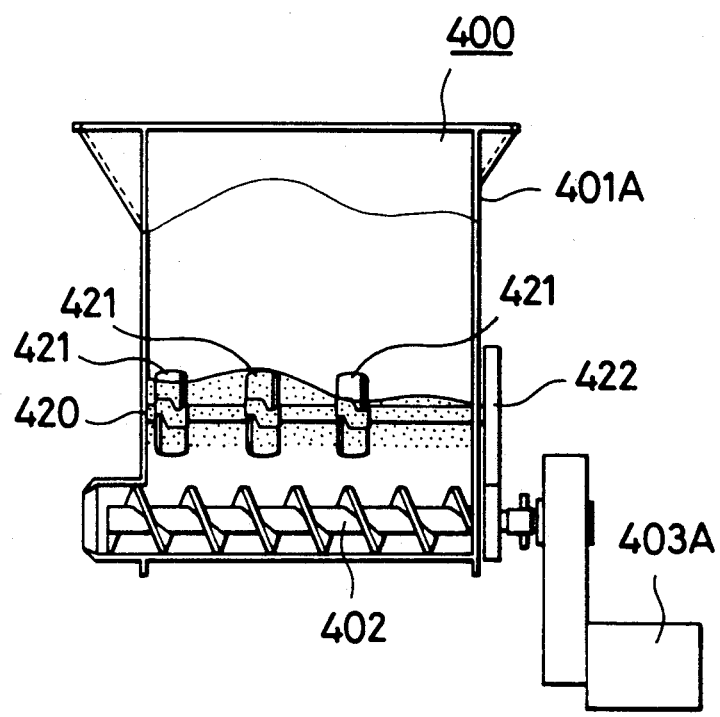

In order to stir the material in the hoppers 401A and 401B, each hopper is preferably provided with an agitator 420 having blades 421 for tending the material in the direction opposite to the direction tended by the auger 402, as shown in FIG. 23. This helps minimize uneven distribution of the material caused by the auger 402, thereby permitting constant amount of material to be delivered from the hopper 401. When the amount of the material remaining in the hoppers 401A and 401B becomes less than a predetermined level, sensors will initiate a replenishment operation, as described in detail below. It should be noted that the auger motor 403 may be utilized also to rotate the agitator 420 via a gear 422.

Figure 25:
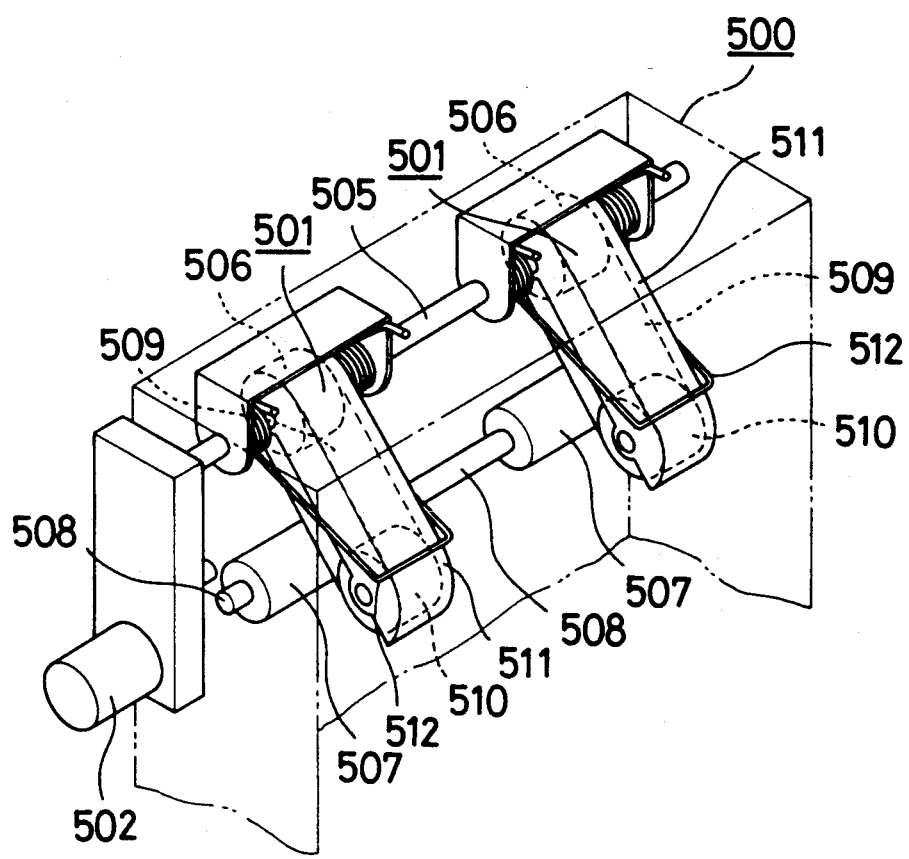
FIGS. 25 through 27 show the empty pack collector unit.
Figure 26:
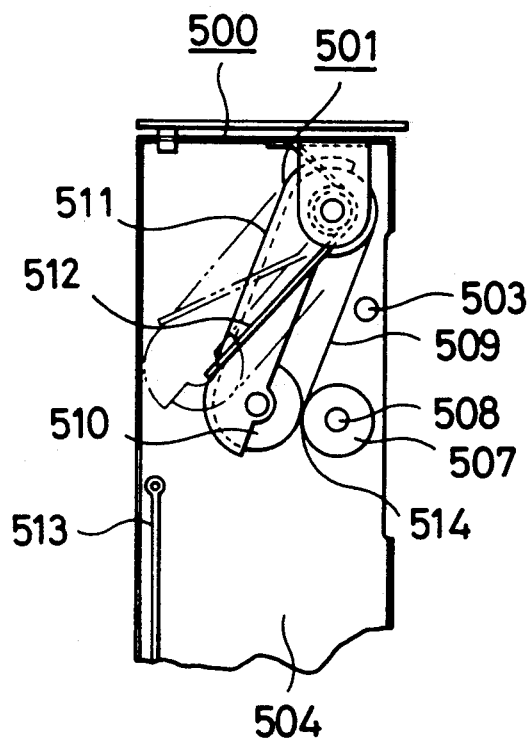
Figure 27:
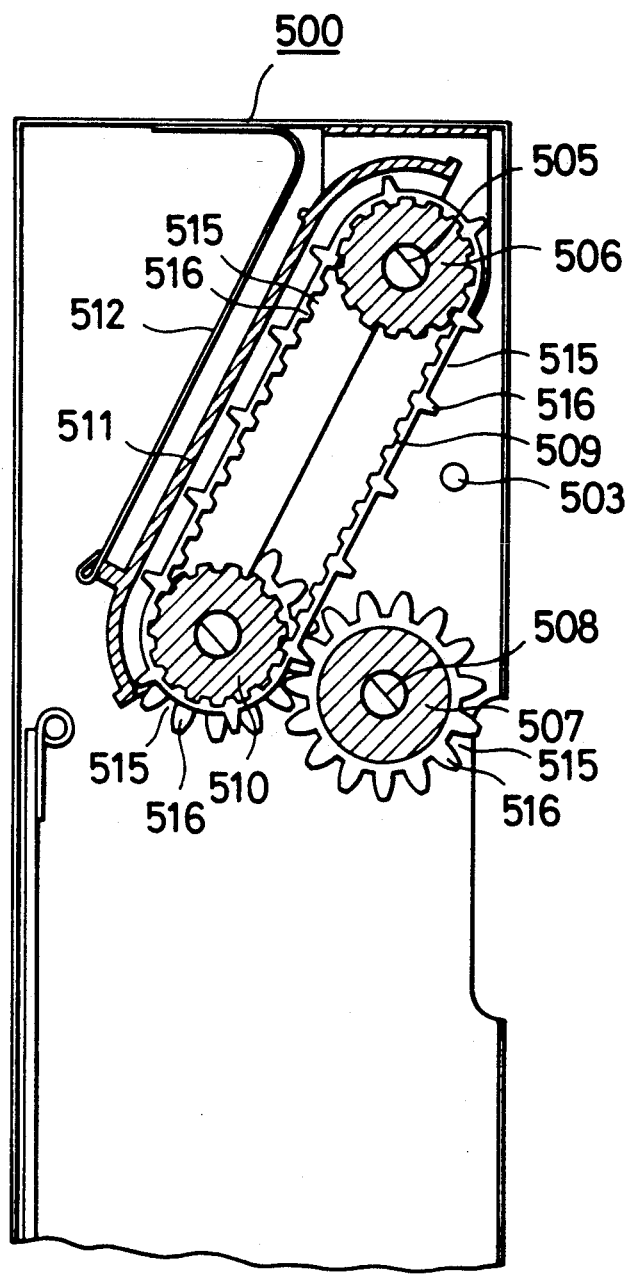

The empty pack collector section 500 comprises, as shown in FIGS. 25 through 27, collector drive units 501, a collector motor 502 for driving the drive units 501, empty pack collector sensors 503, and empty pack collectors 504.

Two collector drive units 501 are arranged in parallel with each other in a transverse (right/left) direction, with one collector drive unit 501 comprising: a shaft 505 provided at an upper portion of the empty pack collector section 500 driven by the motor 502; a pulley 506 mounted on the motor shaft 505 at a position corresponding to the associated cut-and-push section 300; a roller 507 mounted below a drive pulley 506; a roller shaft 508 for rotatably supporting thereon the roller 507; a driven pulley 510 for supporting a collector belt 509 so that the belt abuts on the roller 507; a housing 511 rotatably supported by the motor shaft 505 and housing a driven pulley 510 so that the pulley 510 abuts on the roller 507; and a spring 512 for biasing the housing 511 so that the housing 511 forces the driven pulley 510 against the roller 507. The shafts 505 and 508 for the other collector unit are actually the extensions of the respective shaft for the one collector drive unit.

The housing 511 are loosely mounted on the motor shaft 505 as shown in FIG. 26, the portion (referred to as pinch portion) 514 of the belt at which an empty pack is pinched can vary in distance to the roller 507 depending on the thickness of the empty pack pinched.

It should be noted that as shown in FIG. 27, the drive pulley 506, roller 507, driven pulley 510, and collector belt 509 may be provided with projections 516 recesses 515, which help minimize slipping between the contacting portions of these elements, for secure collection of empty packs.

The collector motor 502 drives the motor shaft 505 provided at one side of the collector drive 501. The collector sensor 503 is provided between the drive pulley 506 and the roller 507, and in front of the collector belt 509, to detect if the empty pack was collected in the empty pack collector section 500.

In this way the roller 507 receives its driving power from the drive pulley 506 via the belt 509 when the roller is in contact with the belt. On the other hand when a pack is intervening between the roller 507 and the belt 509, the driving force is not given by the roller 507 associated with it, but receives power from other rollers 505 associated with other belts. Thus, transportation of packs may be always performed securely.

The empty pack collector 504 is mounted below the collector drive 501. The empty pack collector 504 has at its upper portion a shaft for supporting a door 513 which may be freely opened.

Figure 28:
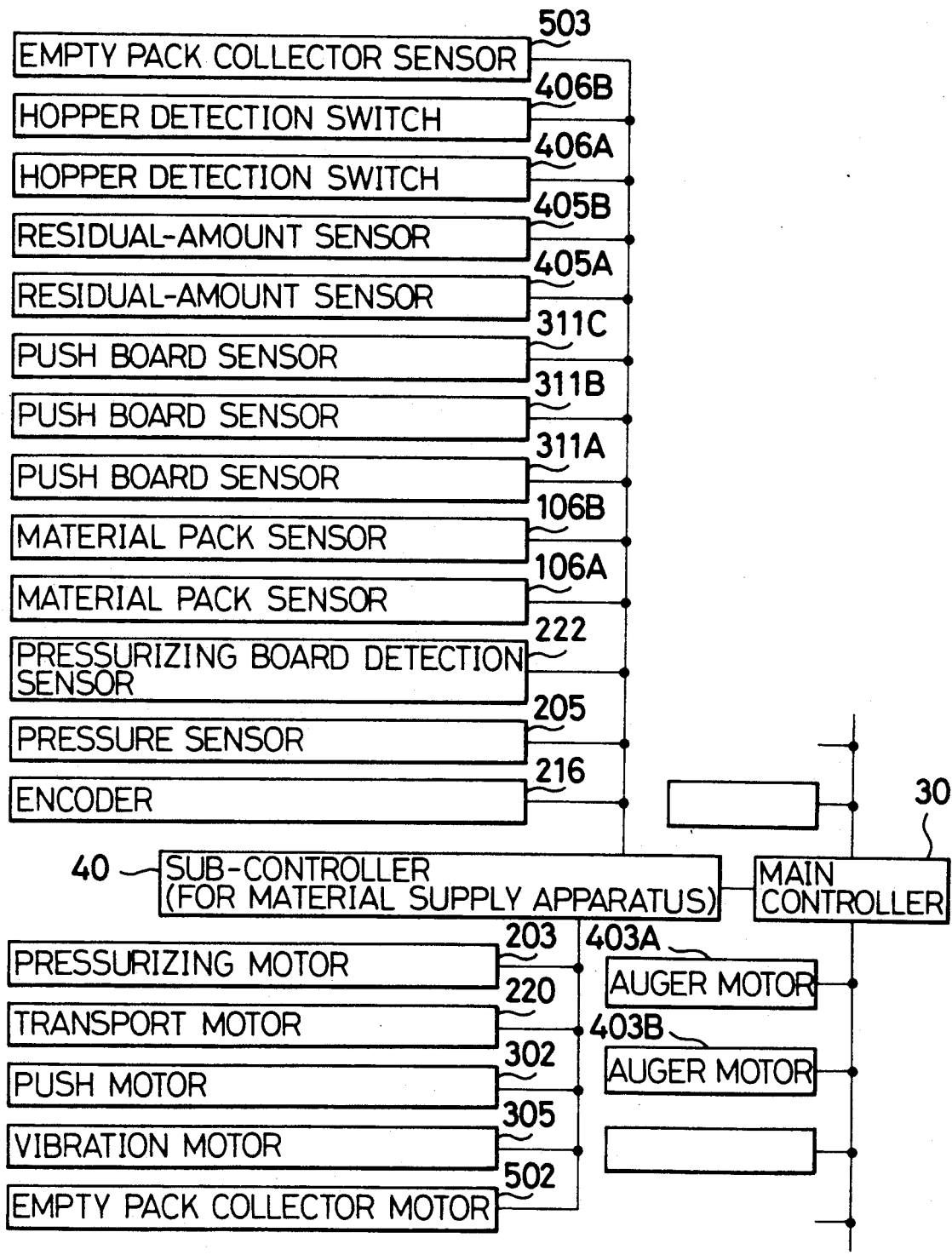
FIG. 28 is a block diagram of control operations for the material supply apparatus.
Figure 29:
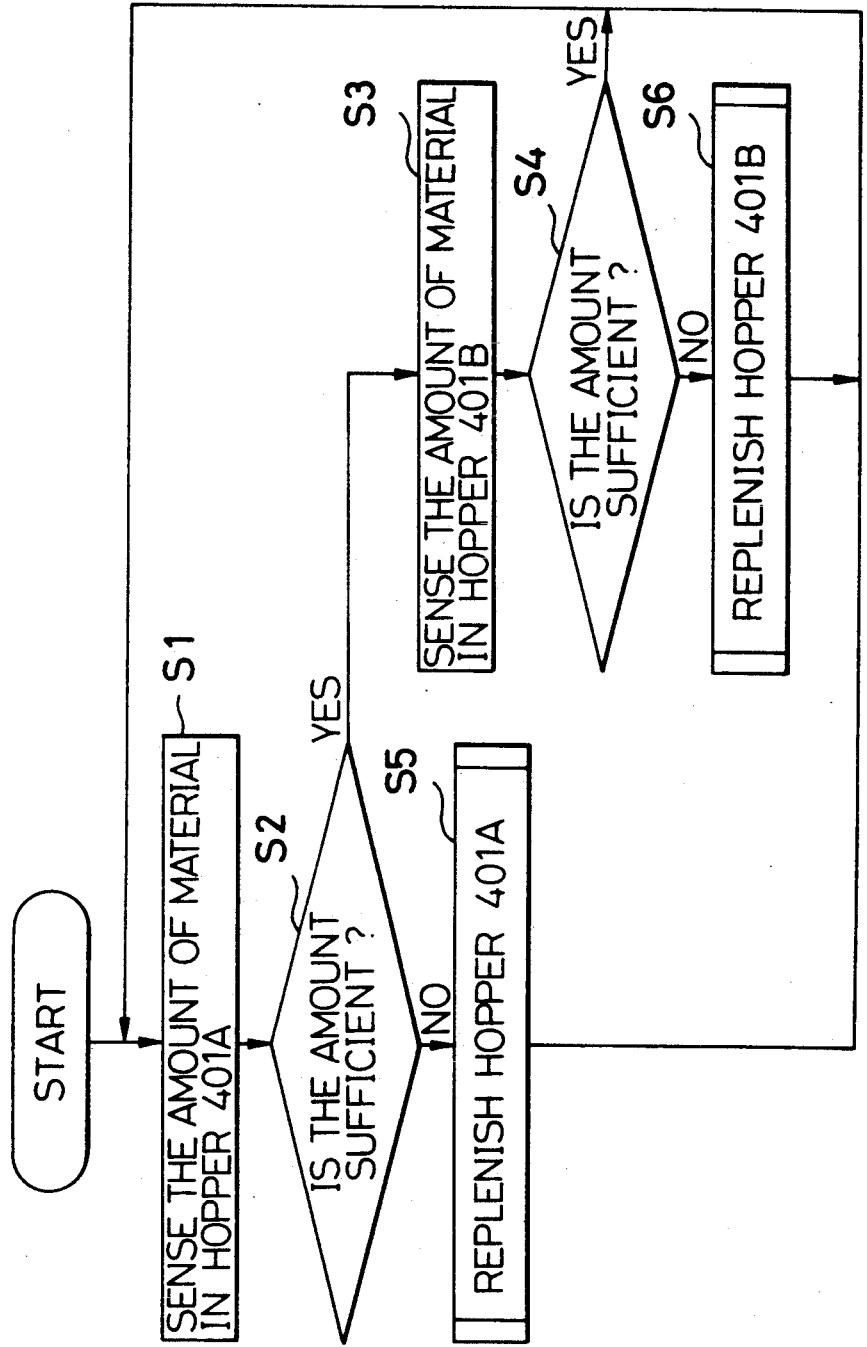
FIG. 29 is a flow chart of a main-routine operation of the material supply apparatus.

Referring now to the FIGS. 28-30, the operation of the above described automatic vending machine will be described. A main controller 30 is responsible for controlling the operations of each component of the automatic vending machine. The main controller 30 is connected with a sub-controller 40 to control a material supply apparatus 7.

Referring to a flow chart in FIG. 29, operations of the material supply apparatus 7 will be described below. First, a sensor 405A for sensing the remaining amount of the material in the hopper 401A senses the amount in Step S1, and based on the signal received from the sensor 405A it is determined in Step S2 whether the amount is less than a predetermined level. If it is not, the process proceeds to Step S3 where a sensor 405B for sensing the remaining amount of the material in the hopper 401B senses the amount, and based on the signal received from the sensor 405B it is determined in Step S4 whether the amount is less than a predetermined level in the 401B. If it is not, the process returns to Step S1 and repeat the process for detecting shortage of the material in the 401A.

Figure 30A:
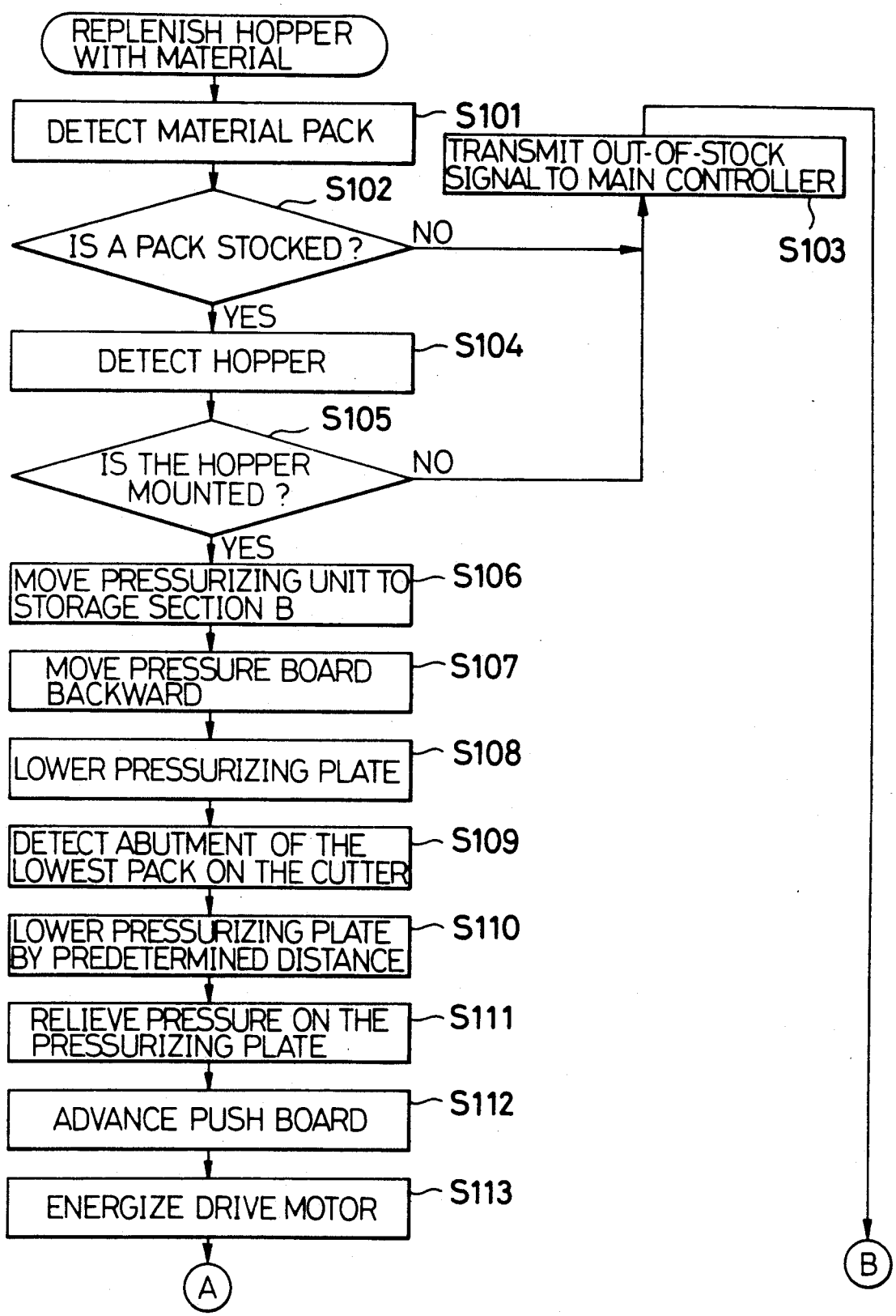
Figure 31:
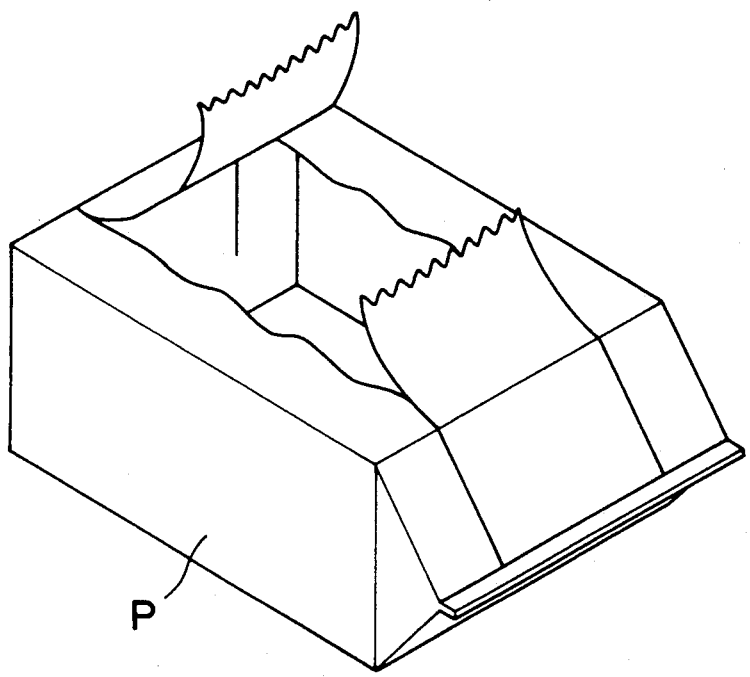
FIG. 31 is a perspective view of a material pack which is cut open by the cutter.

If in Step S4 the remaining amount of the material in the 401B is found less than the predetermined level, the process proceeds to a material replenishment sub-routine shown in FIG. 30. In the replenishment sub-routine, it is determined in Step S102 whether a pack is present in the material storage section B. This is done based upon a signal received from the sensor 106B for sensing (Step S101) the presence of a material pack stored in the material storage section B associated with the 401B. If a pack is not stocked there, the process proceeds to Step S103 where an "out-of-stock" signal is given to the main controller 30 and returns to the main routine. The main controller 30 then stops vending operation for the merchandise for which the out-of-stock signal is received, and visually indicates the signal to inform a manager a need of replenishment.

If in Step S102 a material pack is detected, a hopper detection switch 406B is operated for sensing the hopper 401B (Step S104). In Step S105, it is determined from a signal received from the switch 406B whether the hopper 401B is mounted on the material supply apparatus 7. If the material supply apparatus 7 is dismounted, the process proceeds to the Step S103. If on the other hand the material supply apparatus 7 is mounted, the process proceeds to Step S106 where the transport motor 220 is energized to drive the transport belt 221, which in turn drives the pressurizing unit 200 to the storage section B on the right hand side of the apparatus as seen in FIG. 9. The pressurizing board 201 and the pressurizing arm member 207 of the pressurizing unit 200 are thus moved through a space provided above the back panel 102.

In Step S107 the push motor 302 is energized to make the push board 301 covering the cutter 304 recede to a rear position so that the cutter 304 is completely exposed, until the sensor 311C detects the shield 312 provided on the connection portions 309, when the push motor 302 is stopped to make the push board 301 stopped. The process then proceeds to Step S108.

Figure 11:
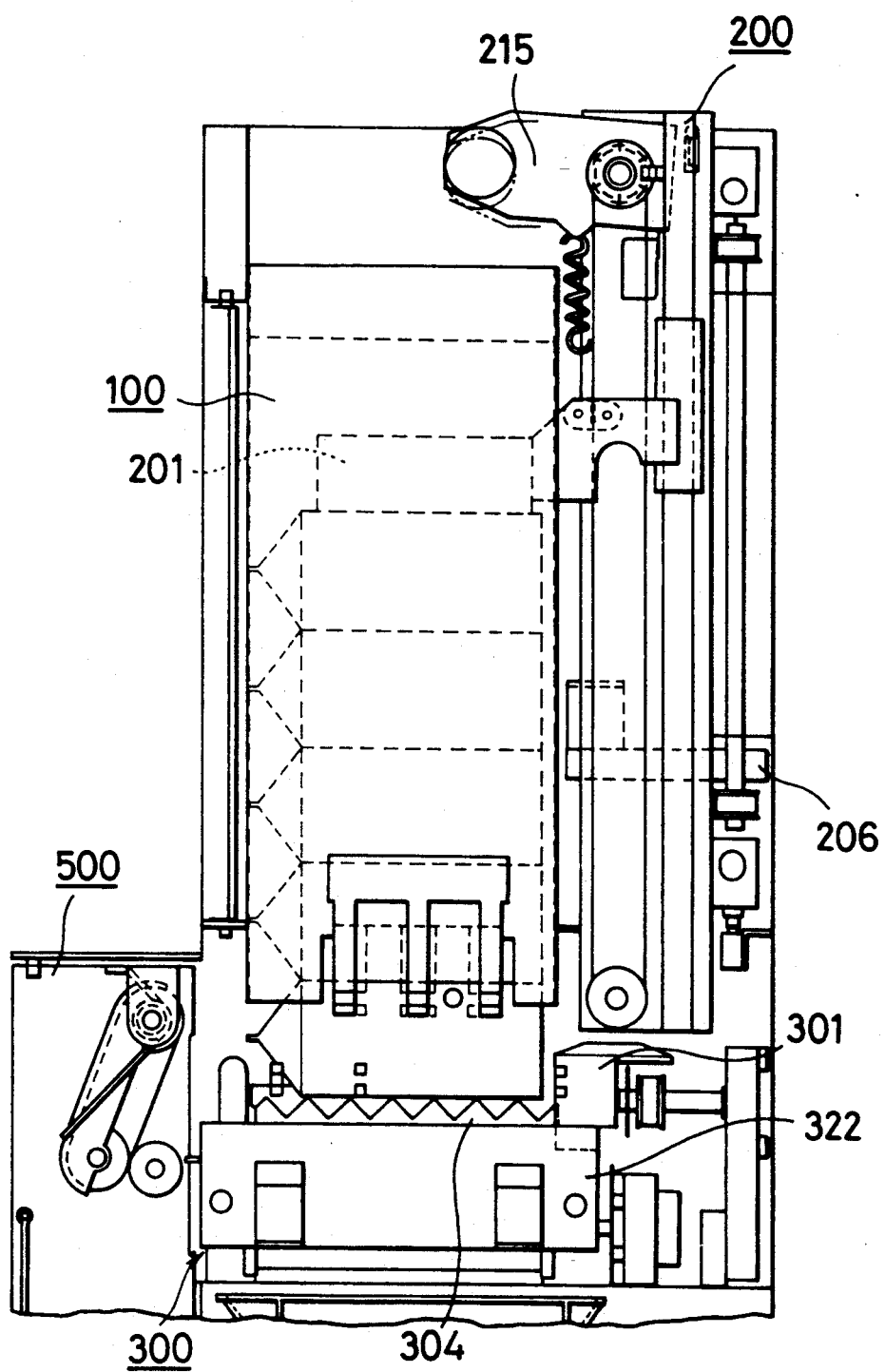
Figure 12:
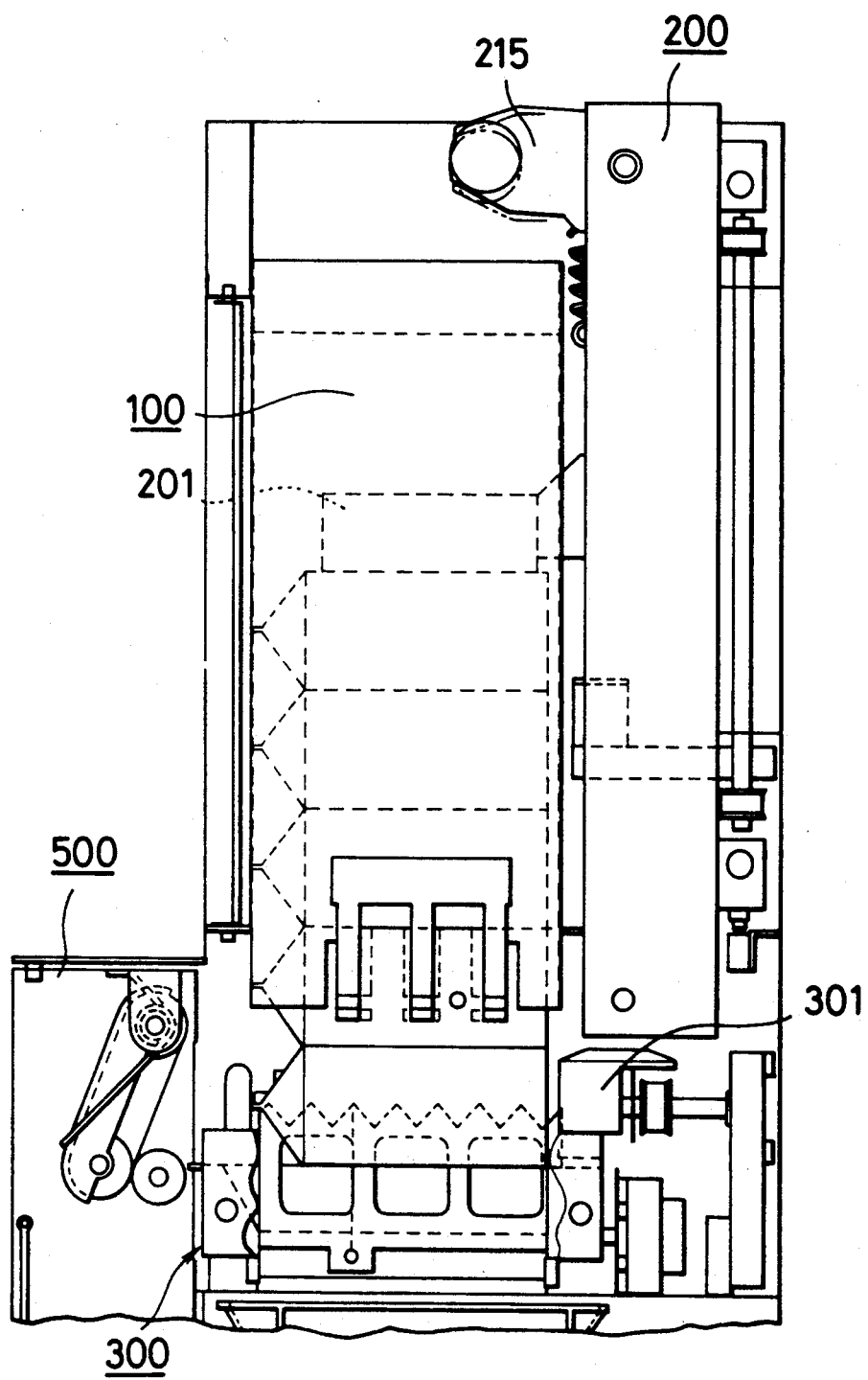

In the Step S108, the pressurizing motor 203 is energized to drive the drive pulley 214 to lower the front portion of the drive belt 204 so that the pressurizing arm member 207 and the pressurizing board 201 connected with the front portion of the drive belt 204 via the coupling member 208 are lowered, thereby causing the lower surface 210 of the pressurizing board 201 to push a material pack out of the holder panels 105 holding the pack as shown in FIG. 11. In Step S109, the material pack thus pushed out is stung by the cutter 304, and as the force applied by the cutter 304 and acting on the pack exceeds a predetermined level defined by the pressure level spring 218, the support member 215 is rotated clockwise as a reaction to the force of the spring 218. Then the projection 219 formed behind the support member 215 actuates the pressure sensor 205. Following the actuation of the pressure sensor 205, the process proceeds to Step 110, where the pressurizing board 201 is further lowered over a distance and sting the pack deeply (FIG. 12). The distance is controlled by counting pulses generated by the encoder 216 mounted on the shaft 213.

After a cut is given to the material pack, the process proceeds to Step S111 where the pressurizing motor 203 is reversed a little to relieve the pressure acting on the pack, after which the push motor 302 is driven so as to advance the push board 301 over a small distance (which is 2-3 cm in the embodiment described here) in Step S112. This promotes cutting of the pack. In Step S113 the vibration motor 305 is energized to vibrate the platform 322 via the vibration mechanism 306 in the R/L direction, so that the material remaining in the pack is removed into the material storage section 400 located below the pack.

After the removal of the material from the pack, the process proceeds to Step S114 for collecting the empty pack. To do this the collector motor 502 is energized to rotate the motor shaft 505, which in turn drive the collector belt 509. In Step S115 the push motor 302 is energized to advance the push board 301.

As the push board 301 and hence the front face 328 advance, the material pack is pushed forward by the front face 328. The front face 328 will abut on the transverse cutter 316 mounted between the central positions of the longitudinal cutters 315. Since, however, the transverse cutter 316 may be rotated forward about the rotatable shaft 317, it does not prevent advancing motion of the push board 301.

Figure 13:
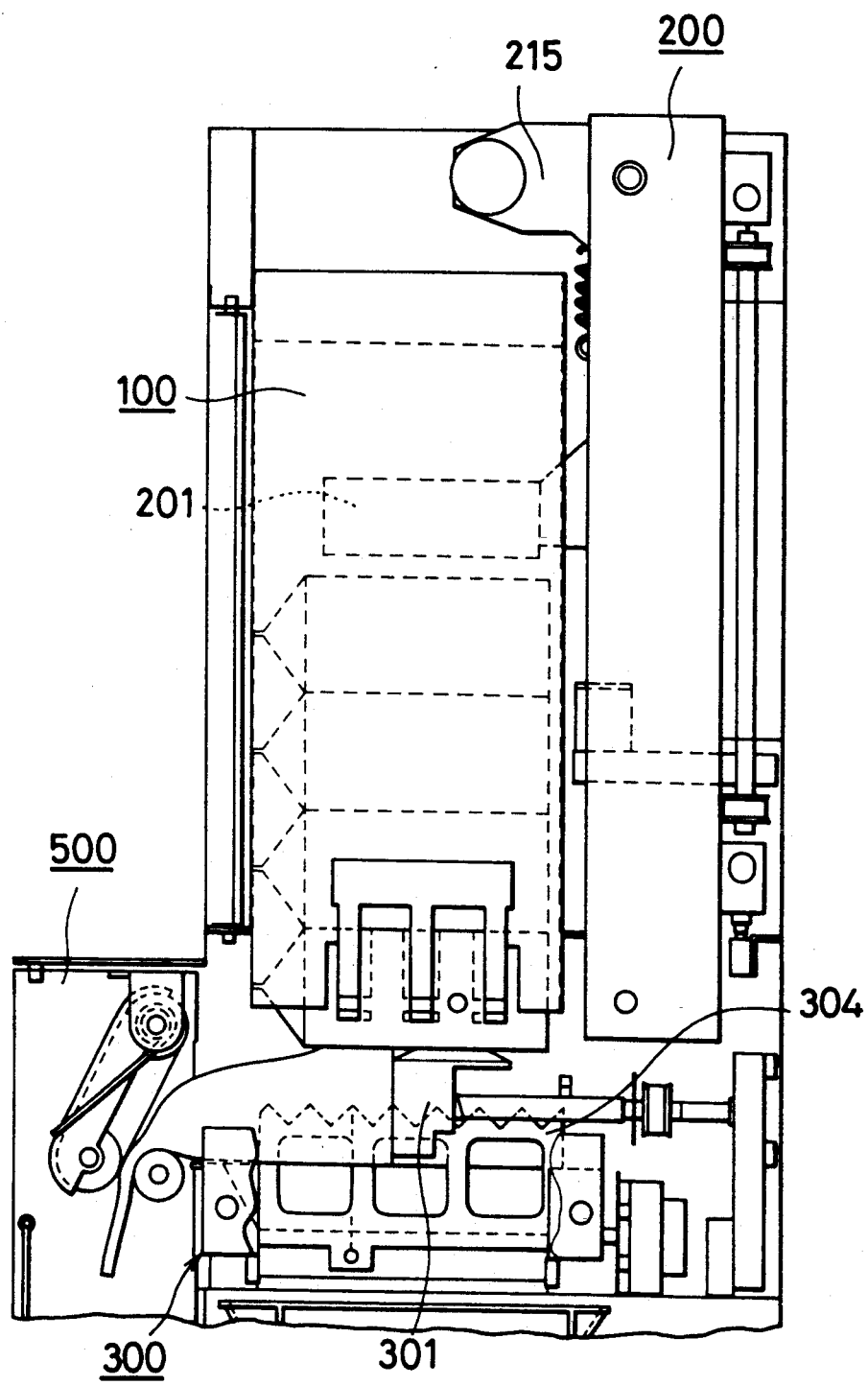
Figure 14:
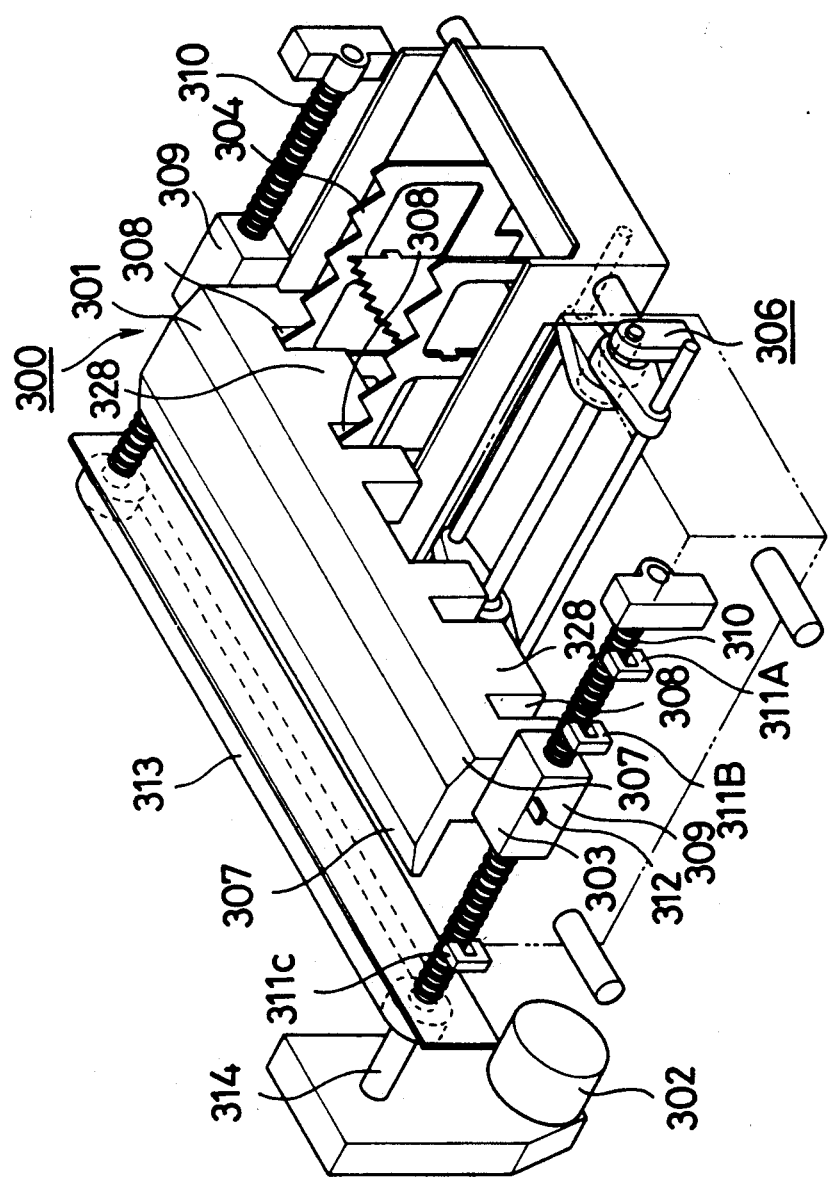
FIG. 14 is a perspective view of a pack opener unit and a push means for removing an empty pack.
Figure 15:
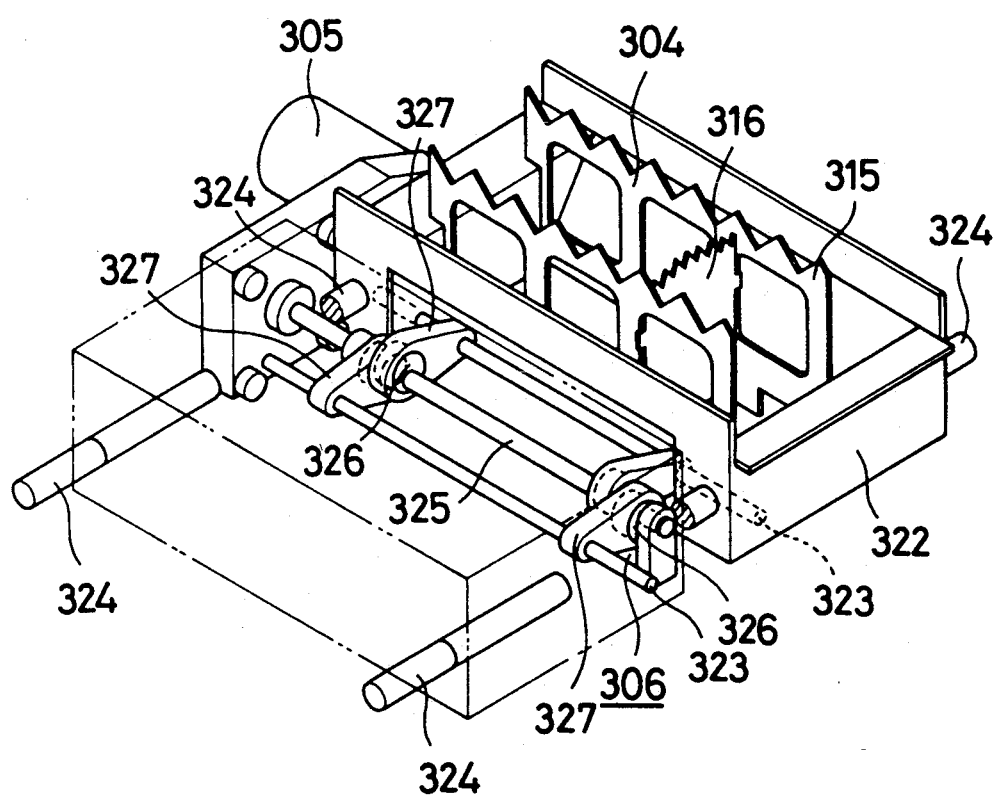
FIG. 15 is a perspective view of cutters and a vibration mechanism of the vibrator unit.
Figure 16:
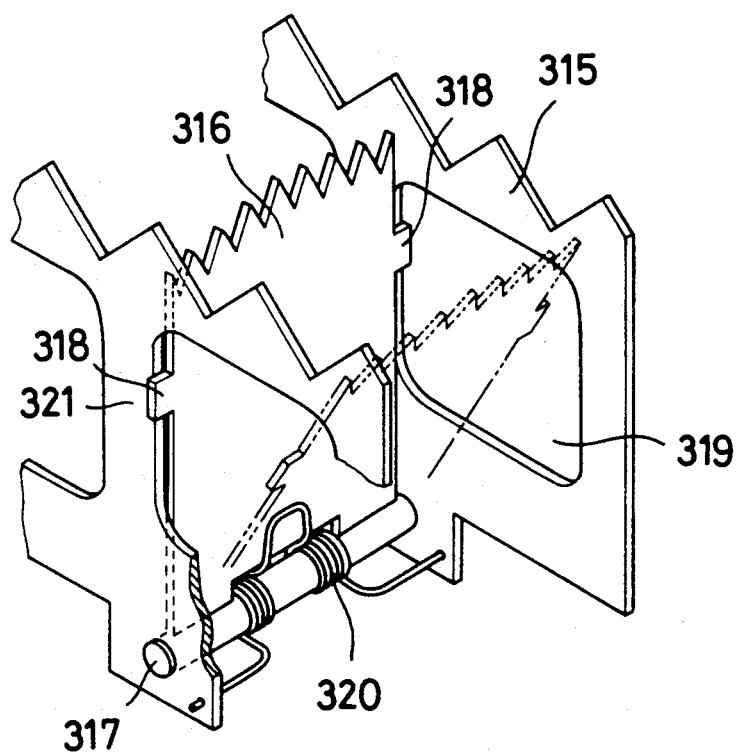
FIG. 16 shows the structures of the cutters in a perspective illustration.
Figure 17:
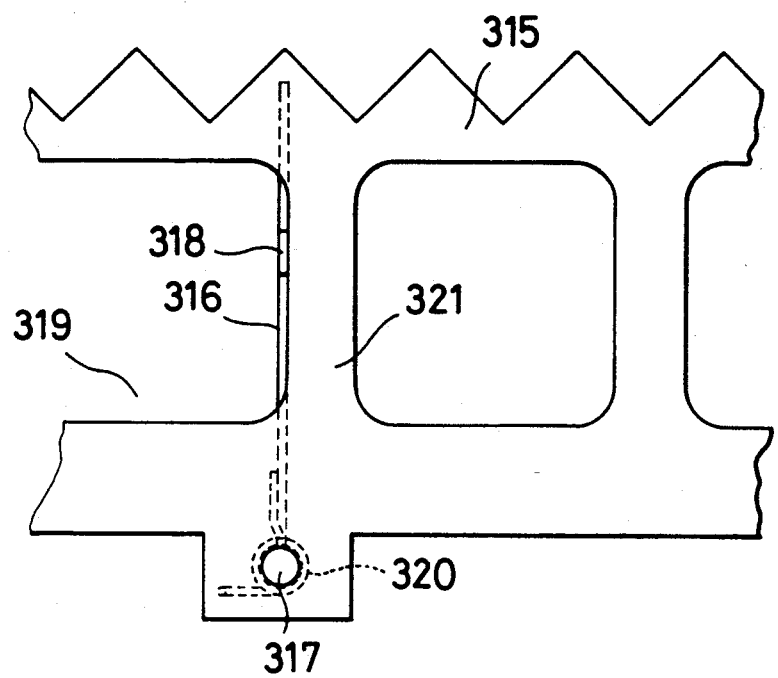
FIG. 17 is a side view of a cutter.
Figure 18:
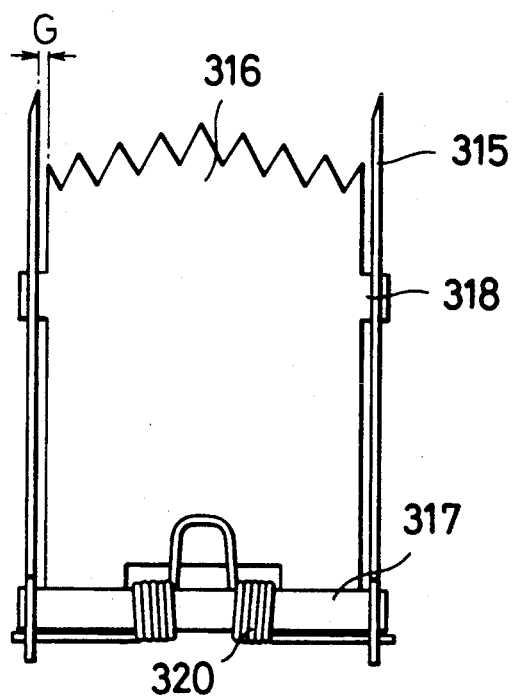
FIG. 18 is a front view of a cutter.

As the empty pack is pushed forward by the push board 301 and abuts on the collector belt 509 of the collector drive 501 as shown in FIG. 13, the pack is pulled by the collector belt 509 into the empty pack collector 504.

Because of the thickness of the empty pack lying on the portion 514 of the collector drive 501, now pinching the pack, the portion 514 is pushed back by the pack against the force of the spring 512 acting on the housing 511 which houses the portion 514, thereby resulting in a gap between the belt 509 and the roller 508. This gap changes depending on the thickness of the pack pinched.

In Step S116, the shield 312 provided on the side of the push board 301 actuates the push board sensor 311A when it passes through the sensor, thereby driving the push motor 302 to withdraw the push board 301 backward until the shield 312 recedes to its standby position past the 311B.

Following the withdrawal of the push board 301, the transverse cutter 316 is pivoted to its original, substantially upright position by the force of the spring 320, until the stoppers 318 abuts on frame portions 321.

In Step S117, the collector sensor 503 is activated to determine if the empty pack has been collected in the empty pack collector 504. If it is determined in Step S118 that the pack has not been collected in the empty pack collector 504, then the process returns to Step S114 via Steps S119 and S120 to repeat the operation as mentioned above. The number of the repetition of the operations is counted in Steps 119 and 120. If the operations have been done twice already, the process proceeds to Step 121 where the main controller 30 receives a failure signal indicative of the failure of the collection, and the process returns to the main routine. Upon receipt of the failure signal, the main controller 30 stops vending operations, indicates a failure sign, and informs the manager of the malfunction of the machine.

Coming back to the step S118, if it is determined that the pack has been collected, the process proceeds to Step S122, where the pressurizing motor 203 is energized in the reverse direction to lift the pressurizing board 201 until the guide section 202 abuts on a switch 222 which is provided for detecting the vertical standby position of the pressurizing 201. The abutment of the guide section 202 will turn on the switch 222, causing the pressurizing motor 203 to stop its operation. The transport motor 220 is then energized to return the pressurizing unit 200 to its standby position associated with the article storage section A.

If in the Step S2 a determination is made that the amount of the material is not sufficient in the hopper 401A, a series of replenishment sub-routine operations mentioned above for the hopper 401B is performed. However, since in this case the pressurizing unit 200 is already located at the standby position associated with the article storage section A for the hopper 401A, the pressurizing unit 200 is not shifted.

I claim:

1. An automatic vending machine for automatically furnishing beverage prepared from powder drink materials supplied from a material supply apparatus installed in the automatic vending machine, said material supply apparatus comprising:

article storage racks for storing stacked packs containing the powder materials;

pressuring means for providing from above downward pressure to said stacked packs;

pack opening means for opening the lowest ones of the stacked packs pressed by said pressurizing means, said pack opening means including a pair of substantially parallel cutters each having teeth shaped edges which are spaced apart along the length of the cutter, and including a transverse cutter which are arranged to, and connected with, and between substantially central portions of, said pair of longitudinal cutters; and further including a platform for holding thereon said cutters;

vibrator units for vibrating said platforms to thereby facilitate unpacking of the material in the pack opened;

material storage units one for each rack for receiving therein said material and supplying said drink preparation unit with a proper amount of powder material in response to a vending instruction;

push means for pushing the empty pack after the removal of the powder material from the pack opened; and empty pack collector units for collecting empty packs pushed by said push means.

2. An automatic vending machine according to claim 1, wherein said transverse cutter is formed with teeth shape edges that heap up toward the center of said cutter to form a generally mountain-like shape, said cutter located between the near peak positions of said longitudinal cutters.

3. An automatic vending machine according to claim 1, wherein said material storage unit preferably includes:

a large upper opening for easily receiving the powder material freed from the pack;

an auger mounted at a lower level inside said storage unit for allowing a fixed amount of powder material to be delivered at a time; and an agitator having blades thereon, said agitator mounted above said auger for transporting the powder material in the direction opposite to the direction of delivery by said auger.

4. An automatic vending machine according to claim 1, wherein said pressurizing unit is provided with:

a casing installed vertically along said article storage rack;

a drive pulley pivotally supported on a horizontal shaft at the top portion of said casing;

a drive belt entrained on the drive pulley and a driven pulley;

a pressurizing board secured on said drive belt for pressuring the packs;

motor support means rotatably mounted on a horizontal shaft above the casing, for supporting a motor;

a motor fixedly supported by the motor support means, with its drive shaft connected with the drive pulley via a gear;

a spring having one end thereof connected with the motor support means and another end connected with said casing so that the spring may provide a force of preset strength for pulling said motor support means downward; and a sensor for sensing the rotation of said motor support means when said support means is rotated by a driving force in excess of the preset spring force, said driving force supplied from the output shaft of said motor via said drive pulley.

5. An automatic vending machine according to claim 4, wherein said material pack opening apparatus is provided with an encoder for measuring the amount of rotation of said drive pulley subsequent to the abutment of the cutter on said pack, so that the depths of the cutters in the pack may be monitored when the cutters are further forced into said material pack in association with the rotation of said motor.

6. An automatic vending machine according to claim 1, wherein said material supply apparatus comprises:

a multiplicity of article storage racks; and a set of pack opener unit, vibrator unit, material storage unit, push means, and empty pack collector unit, with one set associated with a corresponding one of said racks.

7. An automatic vending machine according to claim 1, wherein said empty pack collector units is provided with:

a motor shaft which is common to other article storage racks;

a drive pulley mounted on said common shaft, in association with the corresponding article storage rack;

a roller mounted below said drive pulley;

a housing having one side thereof rotatably supported by said motor shaft and the other side having a driven pulley;

an empty pack collector belt entrained on said drive pulley and said driven pulley; and a spring for biasing the housing so as to push said collector belt against said roller.

* * * * *